(12) United States Patent
Heuel et al.

(10) Patent No.: US 8,469,441 B2
(45) Date of Patent: Jun. 25, 2013

(54) SLIDING DOOR FOR A VEHICLE

(75) Inventors: Gerhard Heuel, Olpe (DE); Michael Krehmke, Plettenberg (DE); Ralf Rottmann, Drolshagen (DE)

(73) Assignee: Dura Automotive Body & Glass Systems GmbH (DE)

( * ) Notice: Subject to any disclaimer, the term of this patent is extended or adjusted under 35 U.S.C. 154(b) by 106 days.

(21) Appl. No.: 12/935,693

(22) PCT Filed: Feb. 12, 2009

(86) PCT No.: PCT/EP2009/000993
§ 371 (c)(1),
(2), (4) Date: Dec. 27, 2010

(87) PCT Pub. No.: WO2009/121451
PCT Pub. Date: Oct. 8, 2009

(65) Prior Publication Data
US 2011/0198883 A1   Aug. 18, 2011

(30) Foreign Application Priority Data
Apr. 1, 2008   (DE) .......................... 10 2008 016 650

(51) Int. Cl.
  *B60J 5/00*   (2006.01)
(52) U.S. Cl.
  USPC .......................... 296/155; 296/146.12; 49/221

(58) Field of Classification Search
  USPC .................. 296/155, 146.11, 146.12; 49/221, 49/223, 209, 260, 216, 217; 16/357, 360
  See application file for complete search history.

(56) References Cited

U.S. PATENT DOCUMENTS

| 6,183,039 | B1 | 2/2001 | Kohut et al. |
| 7,178,853 | B2 * | 2/2007 | Oxley et al. ............. 296/146.11 |
| 2006/0249983 | A1 | 11/2006 | Heuel et al. |
| 2006/0267375 | A1 | 11/2006 | Enomoto |
| 2009/0051194 | A1 | 2/2009 | Elliott et al. |

FOREIGN PATENT DOCUMENTS

| DE | 102004039885 | 2/2006 |
| DE | 60118036 | 8/2006 |
| EP | 1721768 | 11/2006 |
| FR | 2880842 | 7/2006 |
| JP | 09-277833 | 10/1997 |

\* cited by examiner

*Primary Examiner* — Stephen Gordon
(74) *Attorney, Agent, or Firm* — Dilworth & Barrese; Dean B. Watson

(57) ABSTRACT

An improved sliding door for a vehicle comprises a guide rail (5) and a sliding carriage (6) which is mounted on the guide rail (5) in a longitudinally movable manner. The sliding door furthermore comprises a hinge stirrup (7), which is rotatably (8, 9) mounted on the sliding carriage (6) and on a body flange (4), a control lever (11) which is rotatably (12, 13) mounted on the sliding carriage (6) and on a body flange (4), a first intermediate lever (10) which is rotatably (17) mounted on the control lever (11), and a second intermediate lever (18) which is rotatably (19, 20) mounted on the first intermediate lever (10) and on the sliding carriage (6).

8 Claims, 30 Drawing Sheets

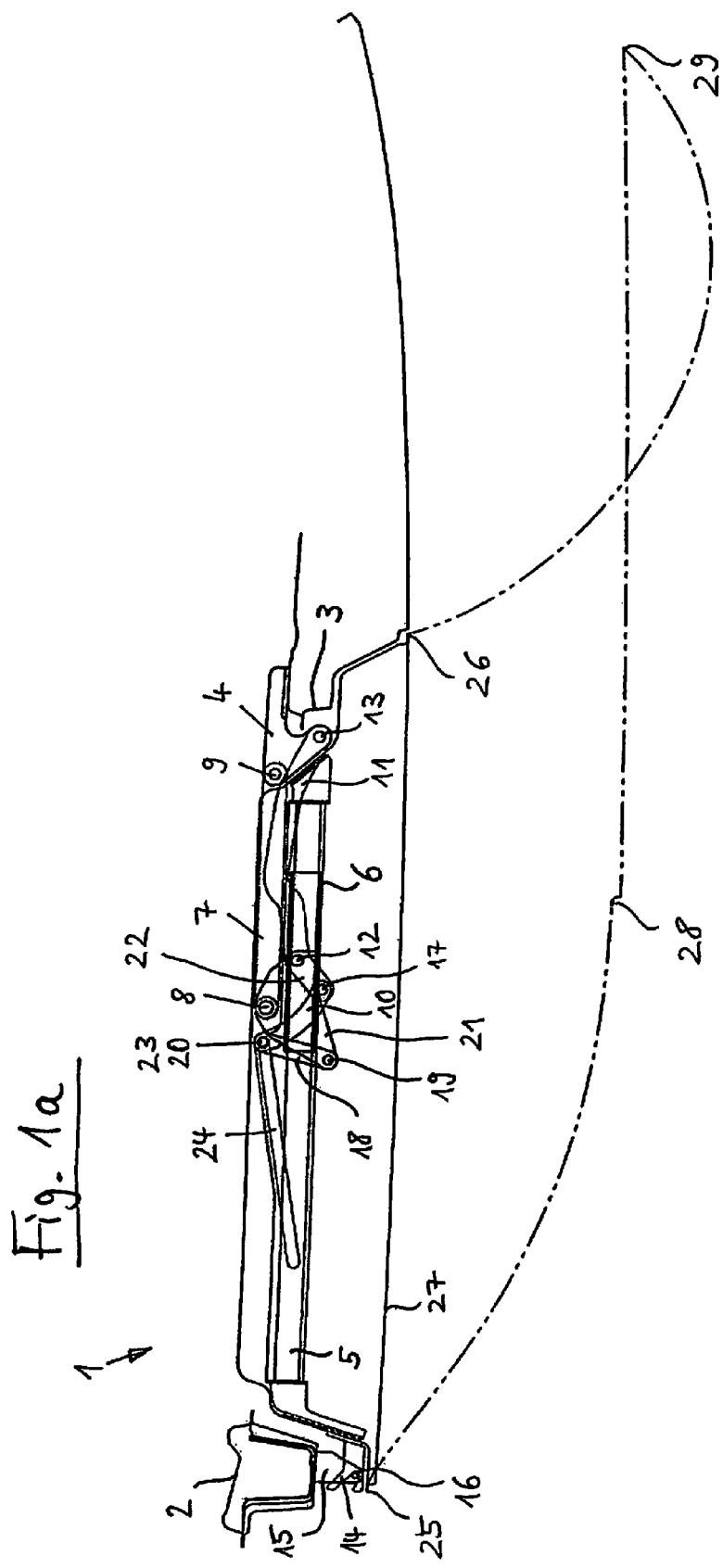

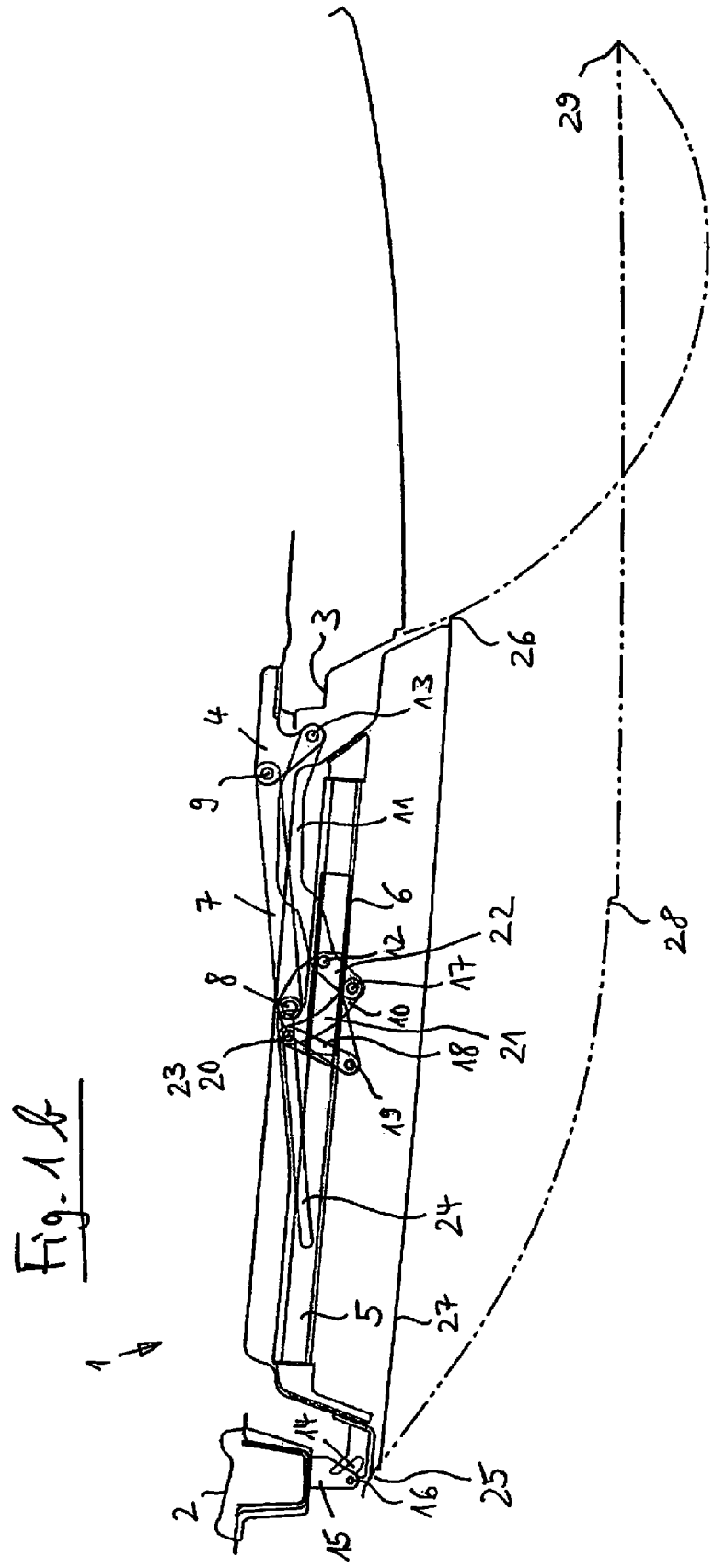

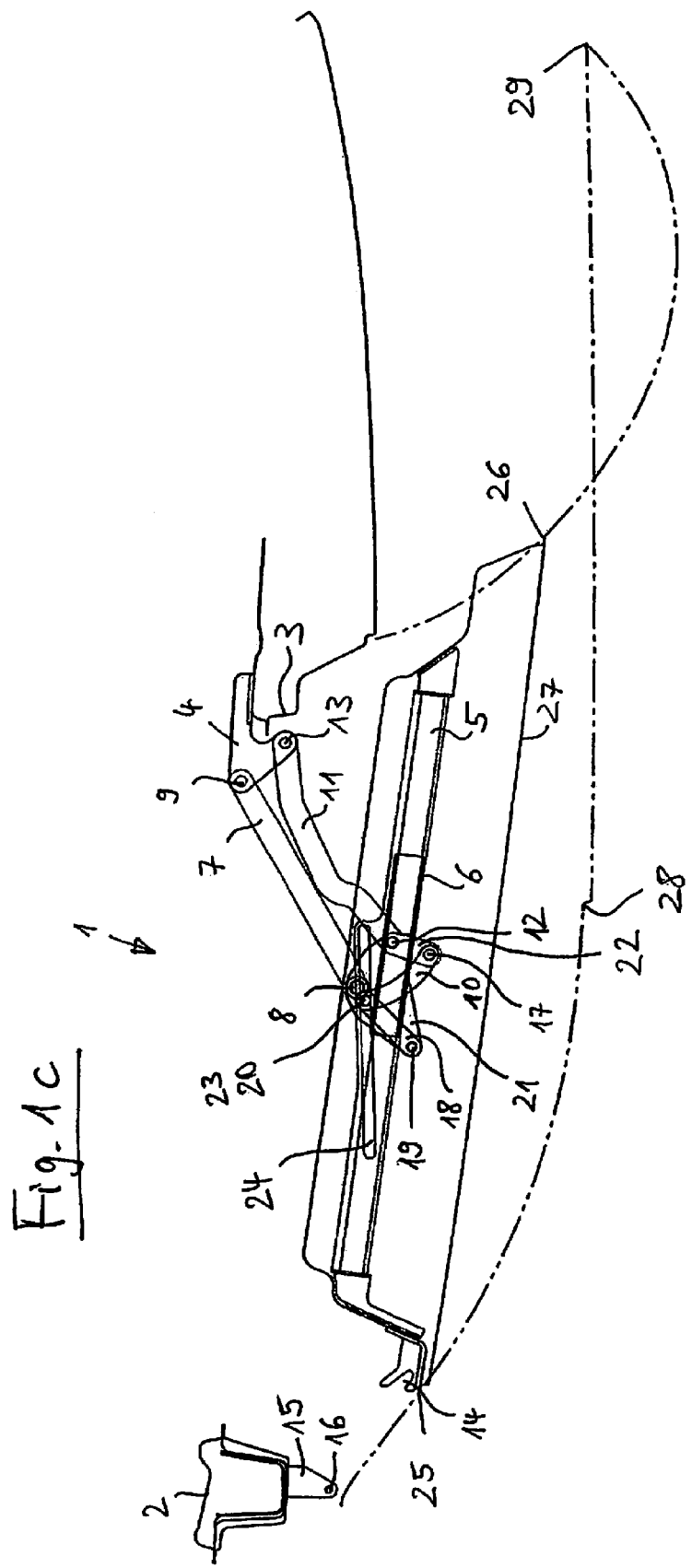

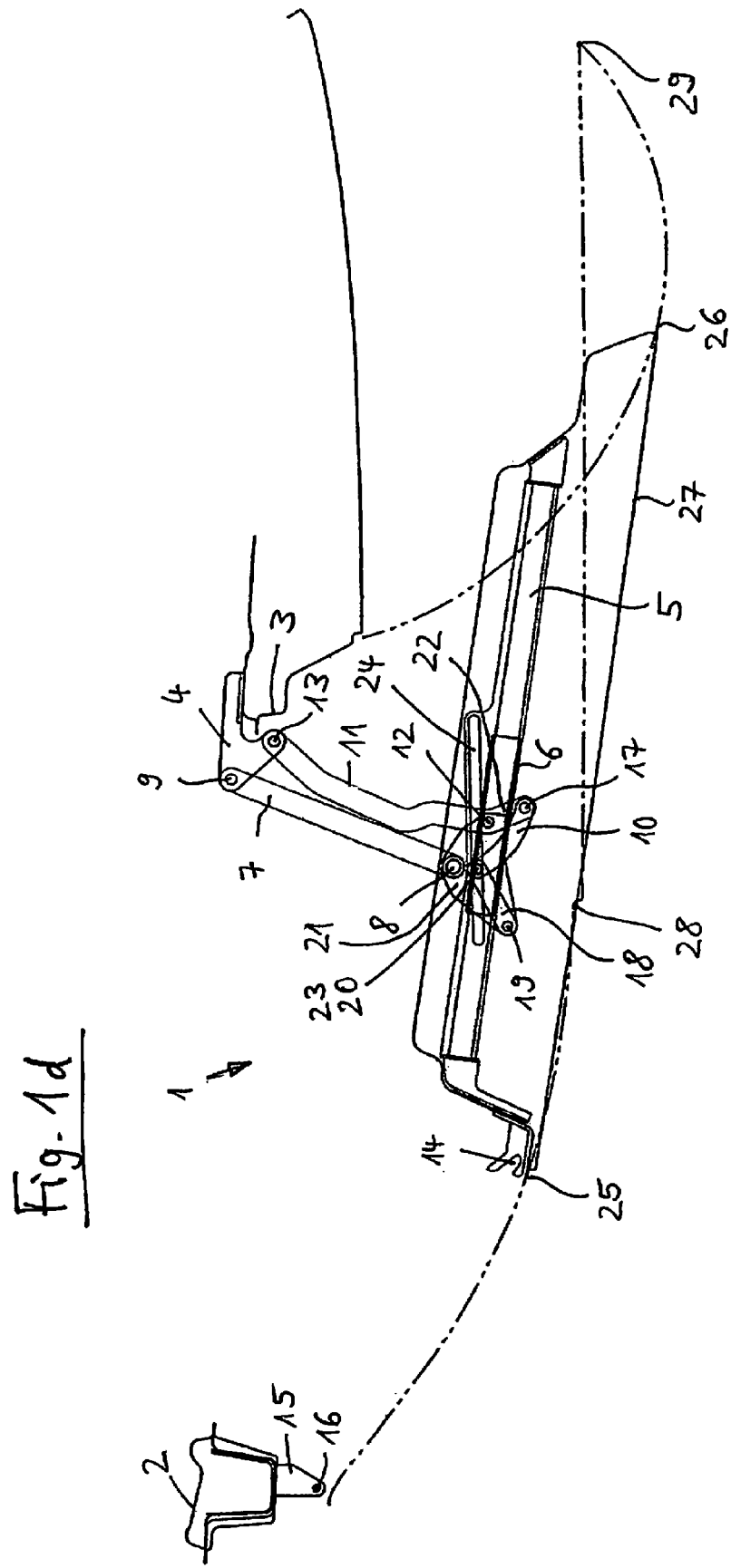

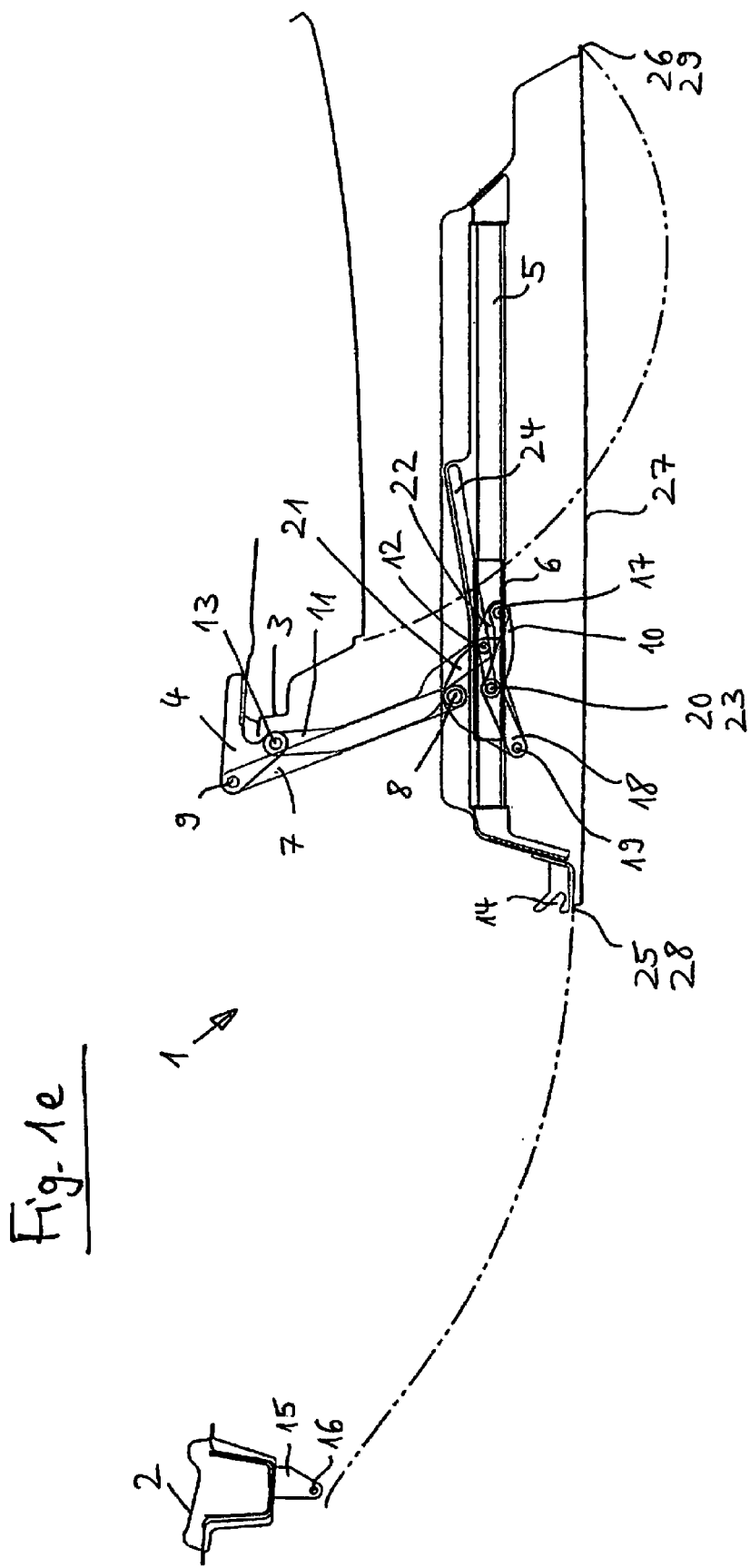

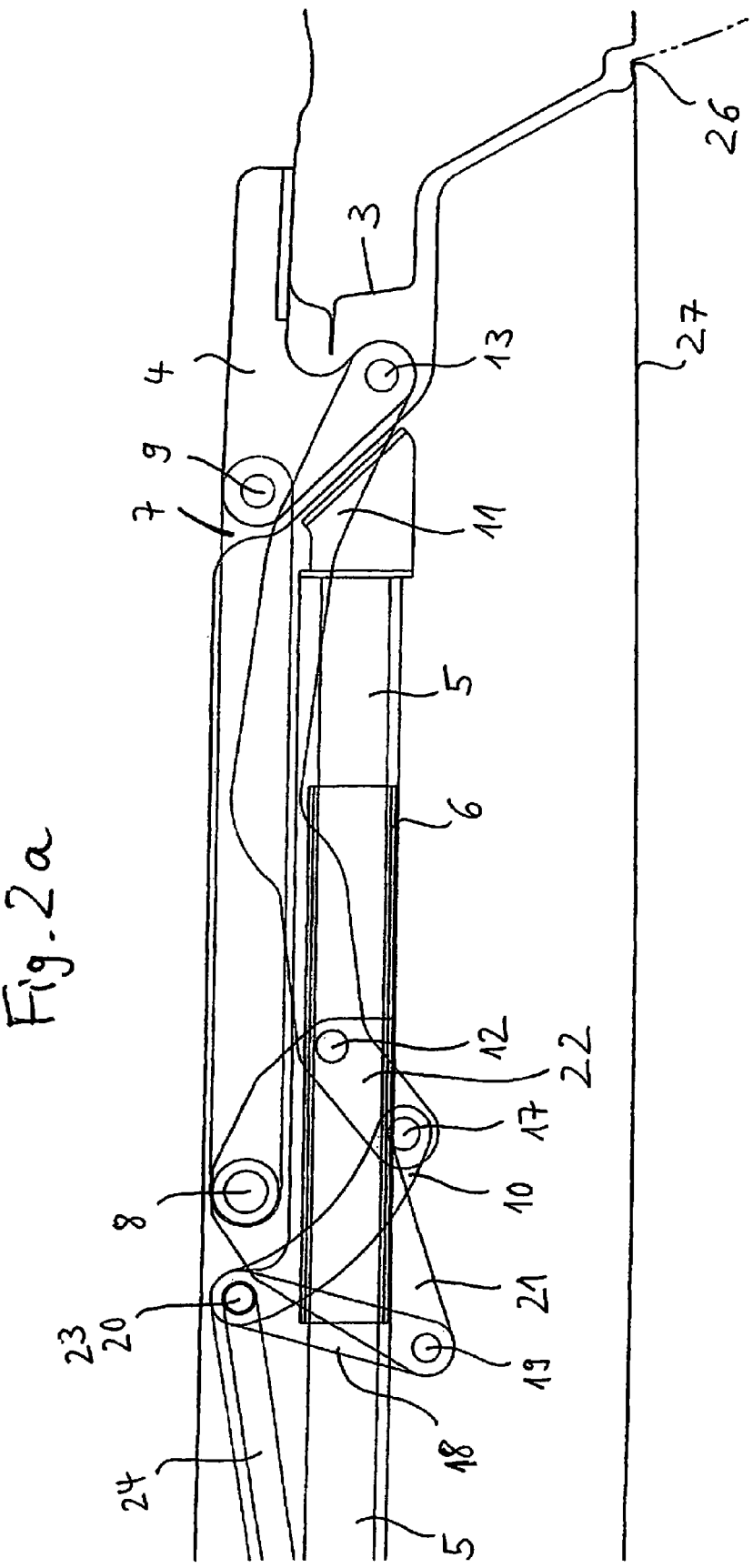

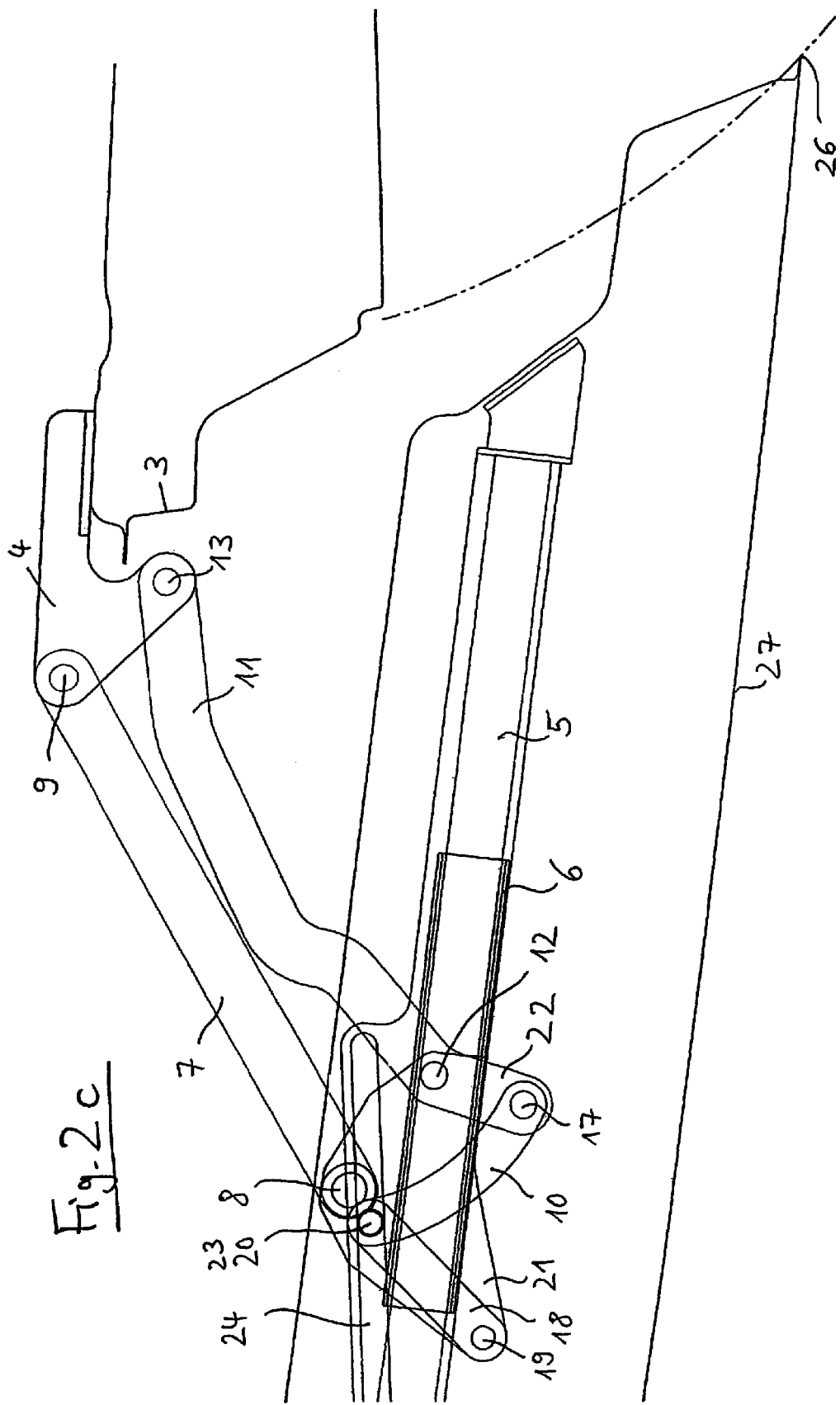

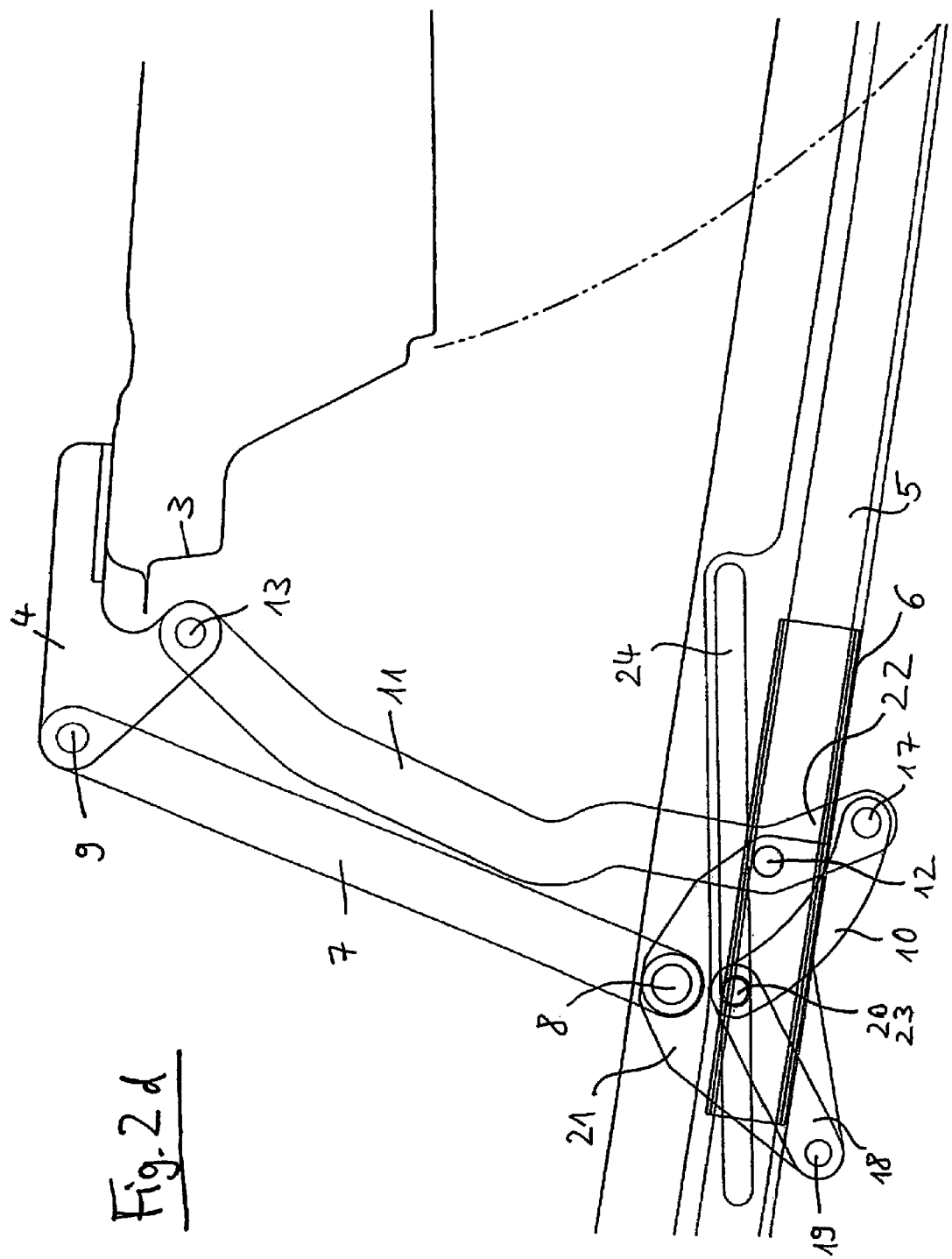

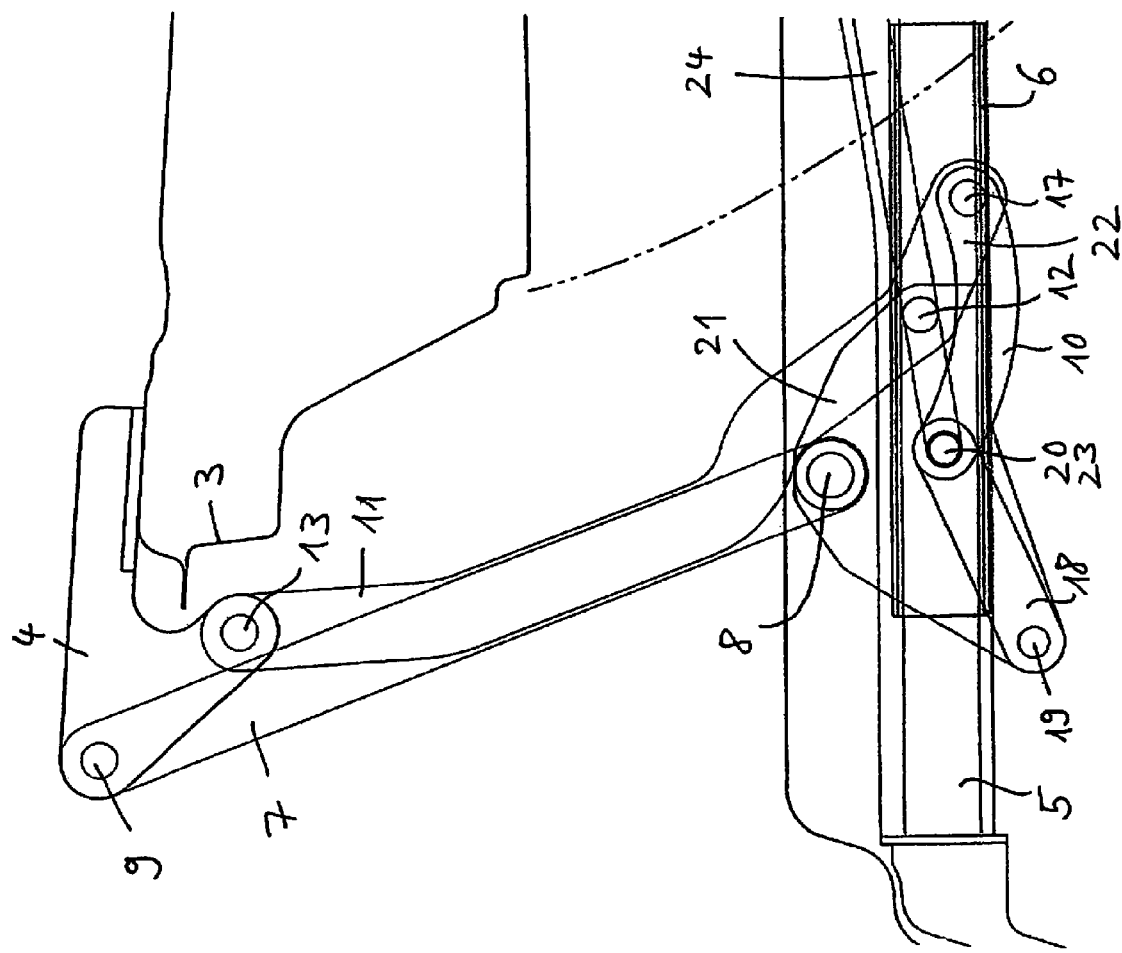

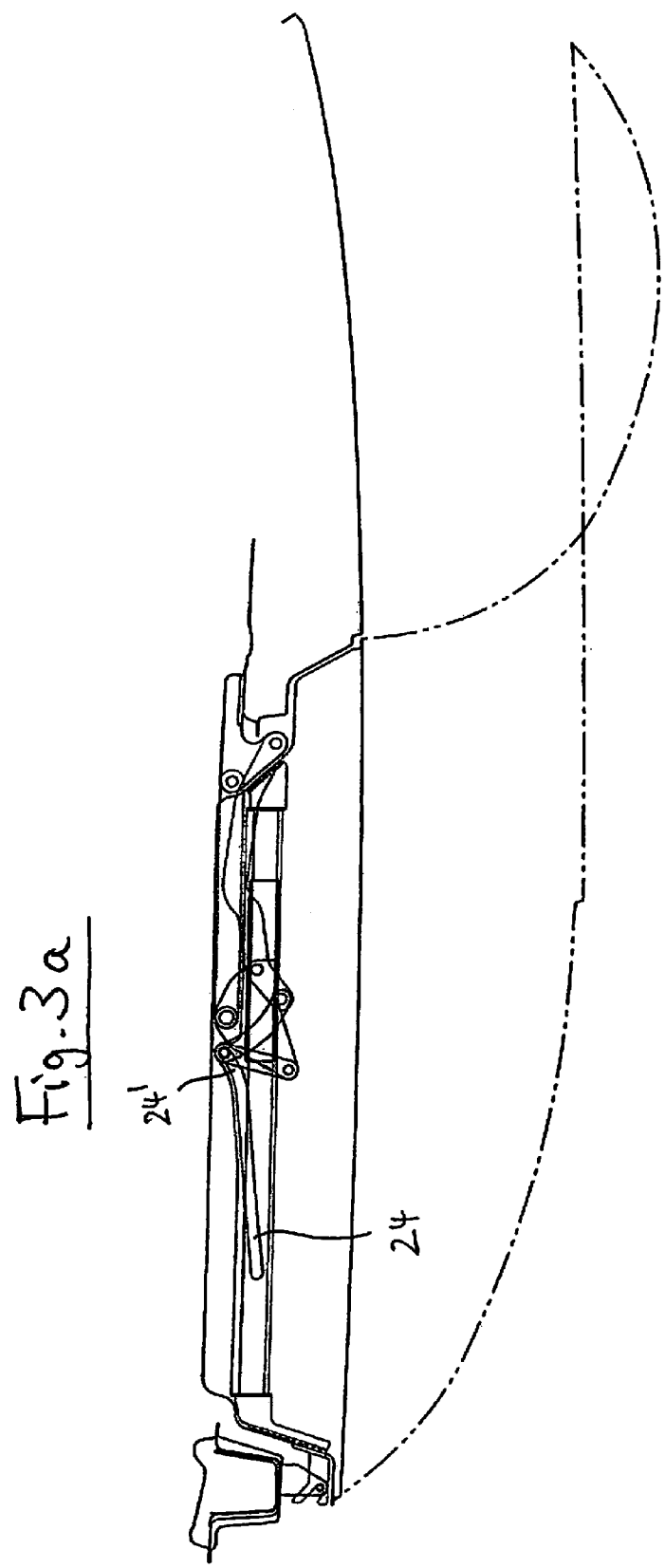

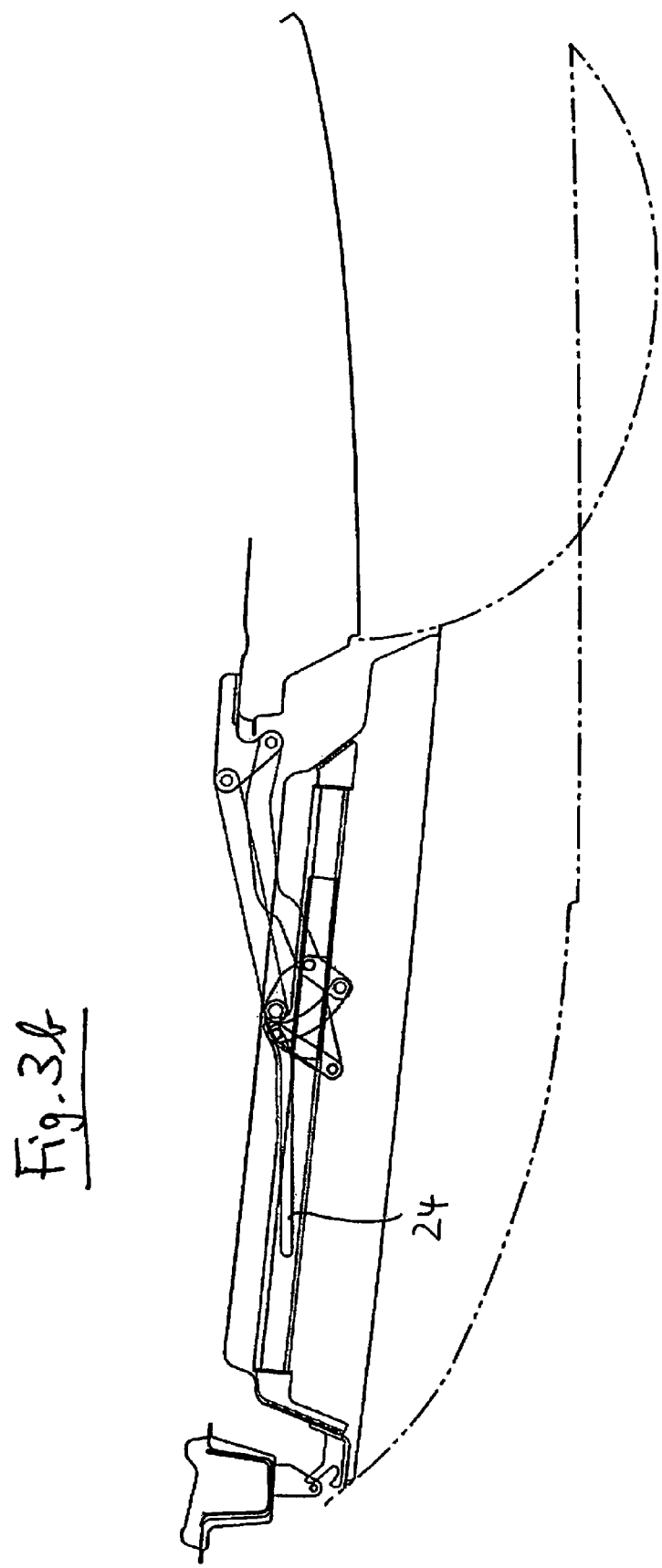

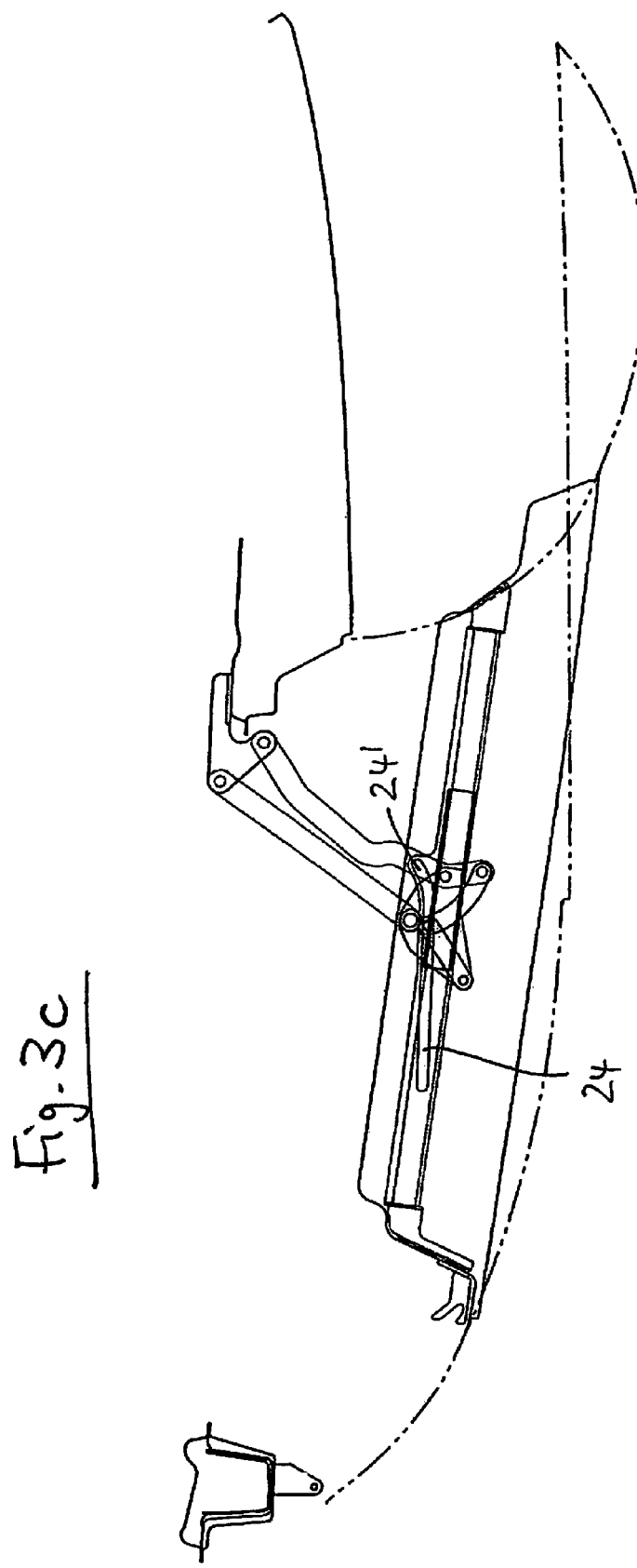

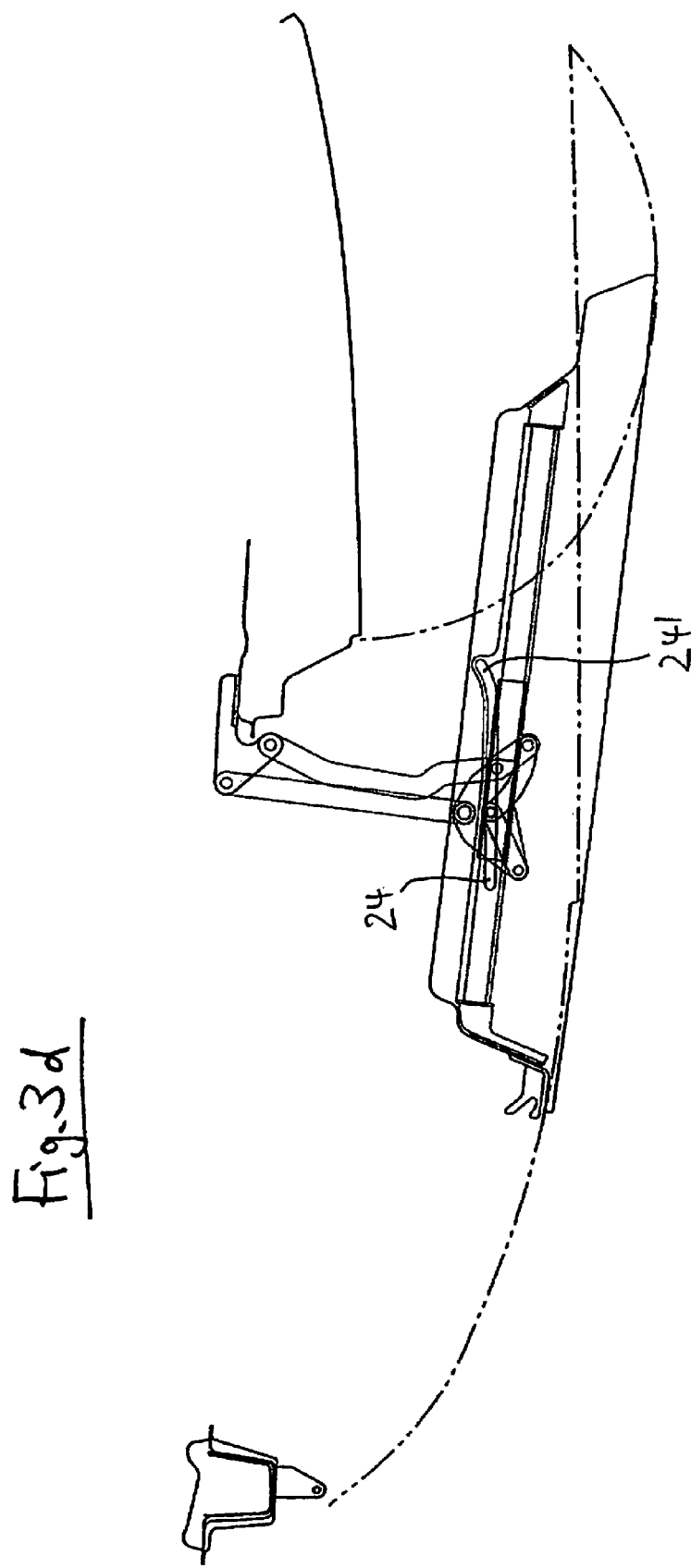

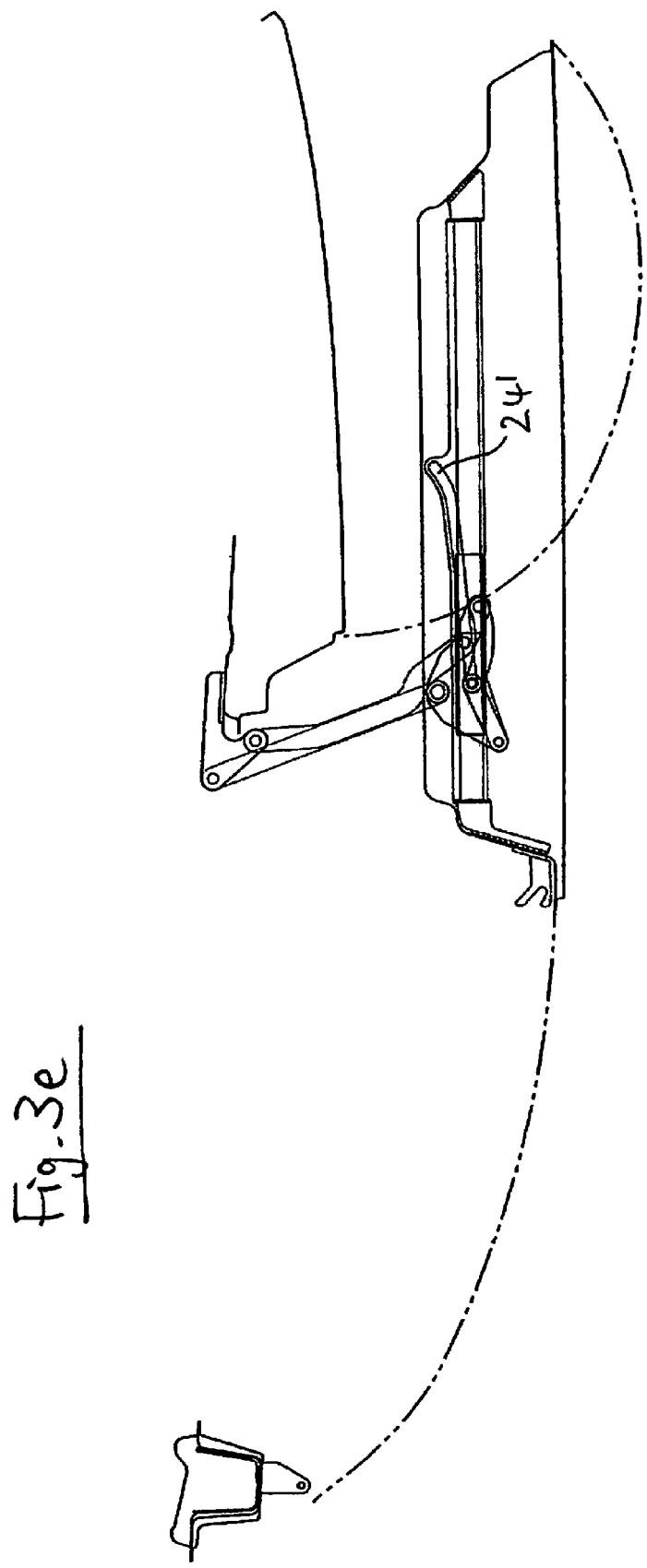

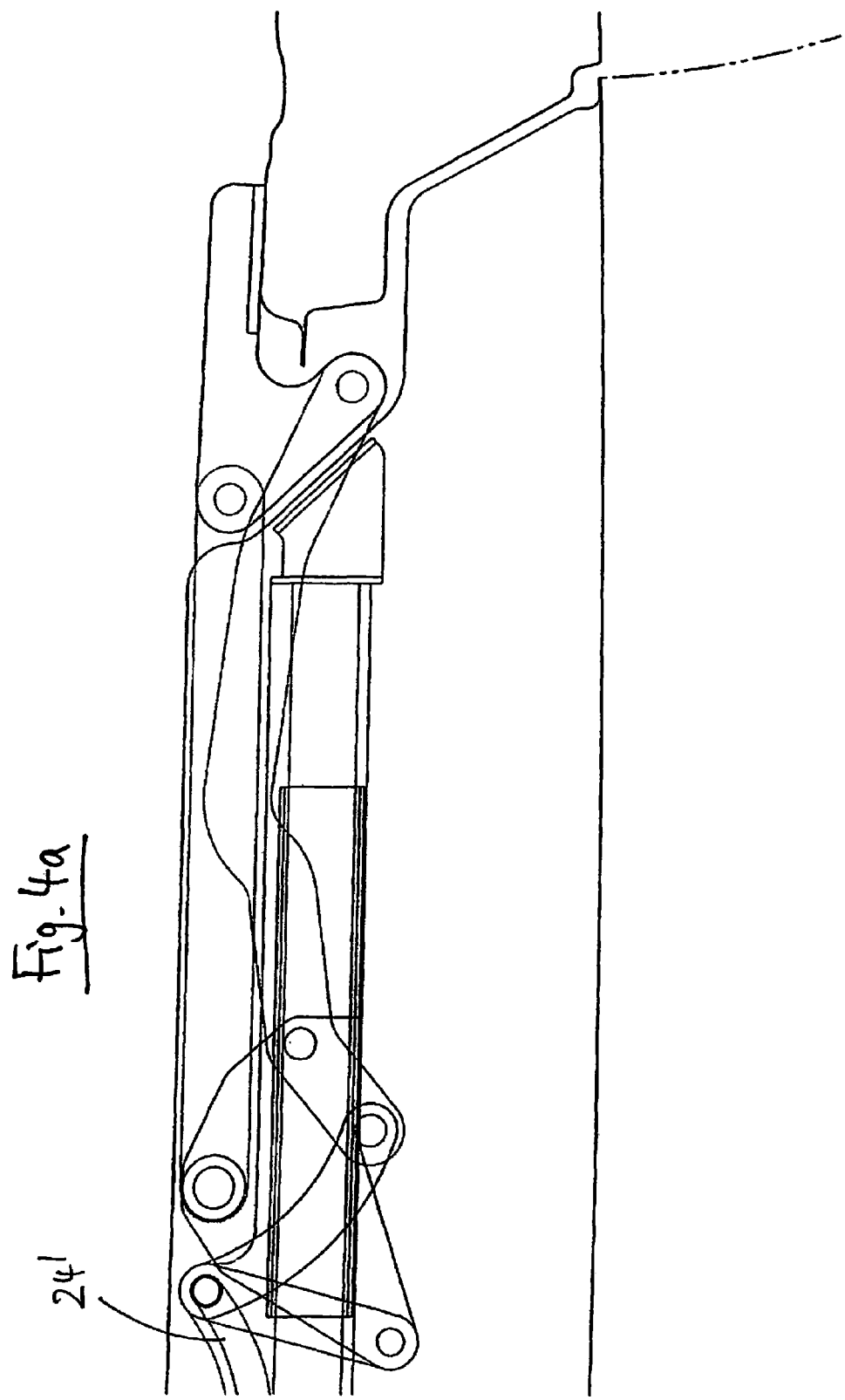

241

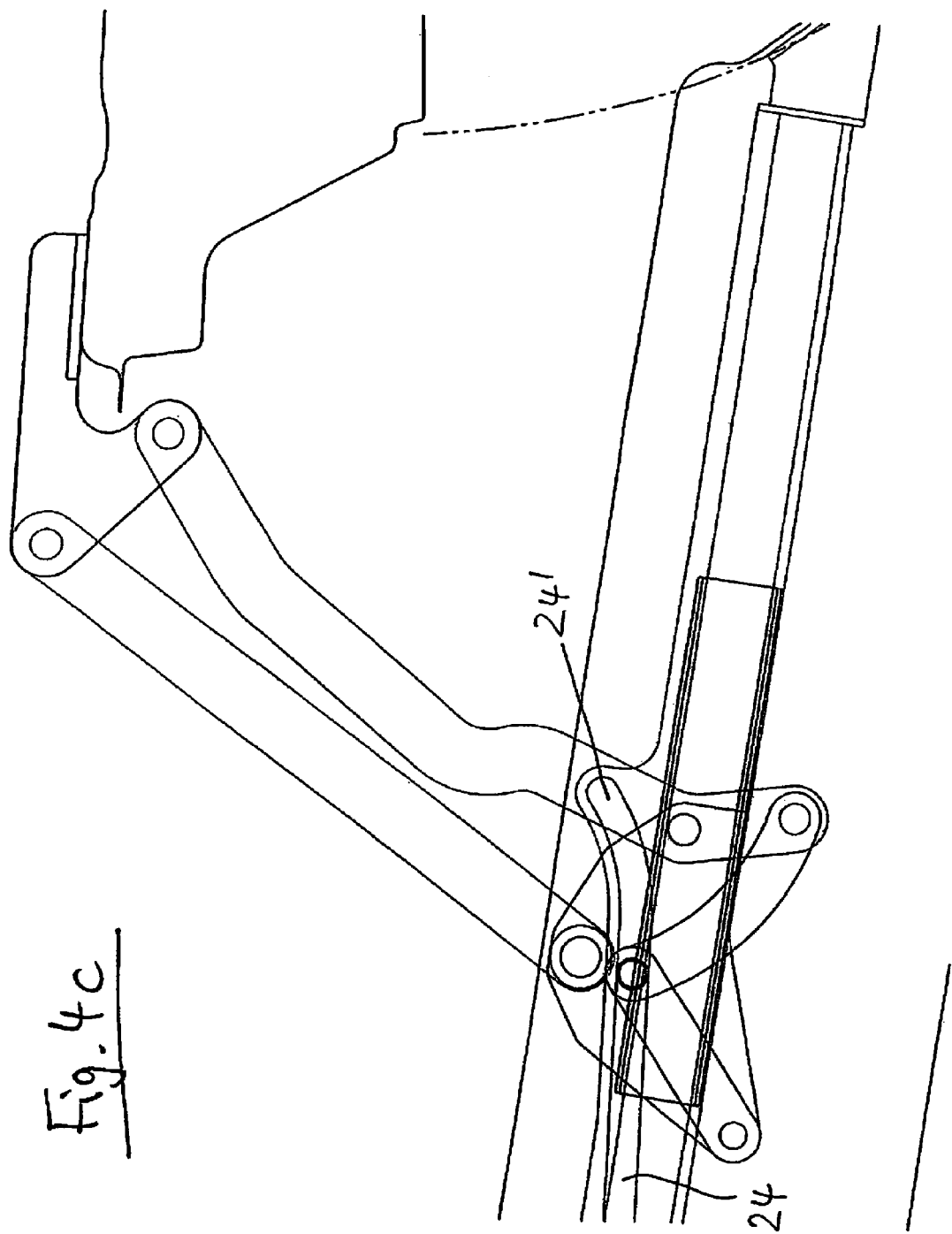

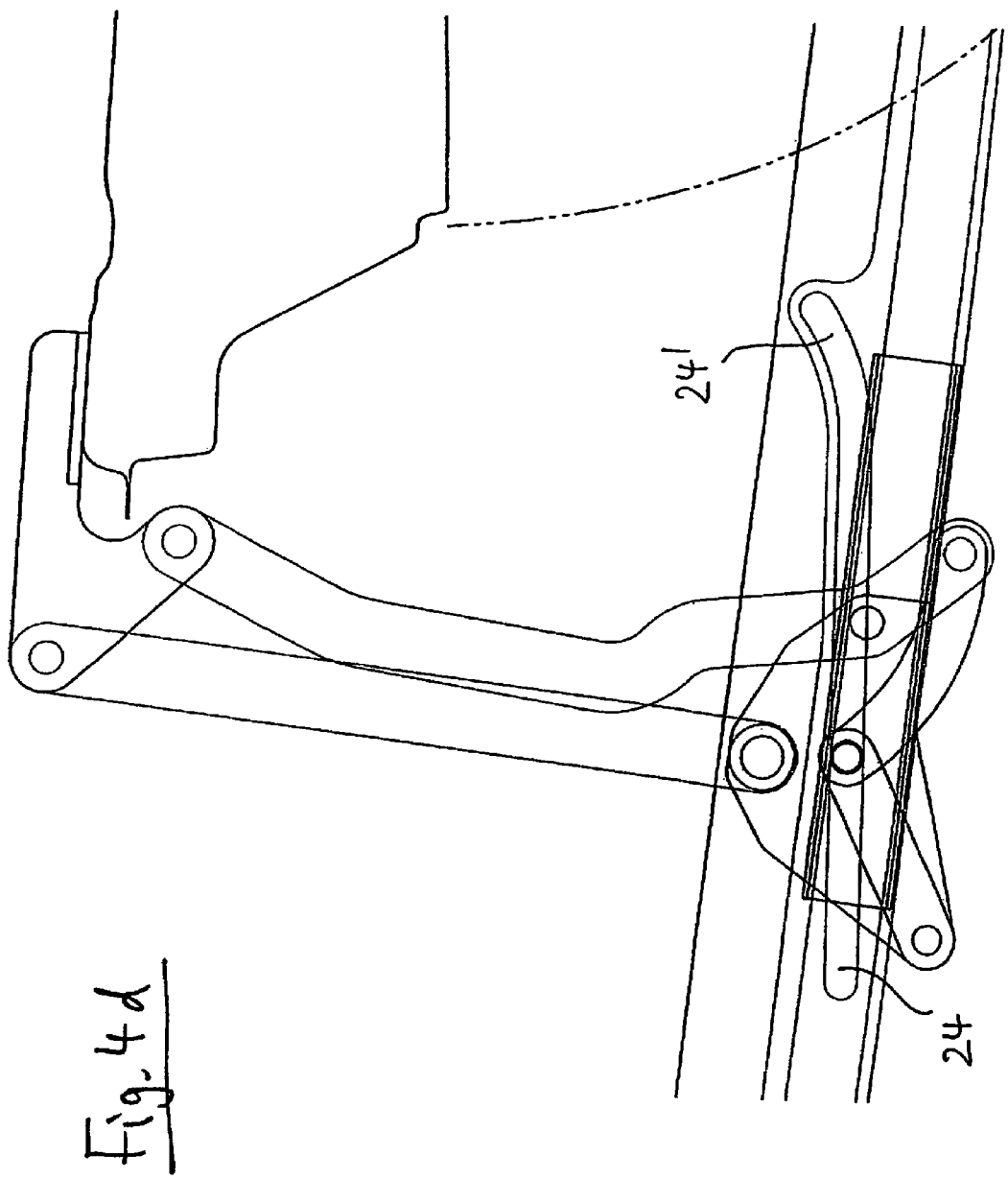

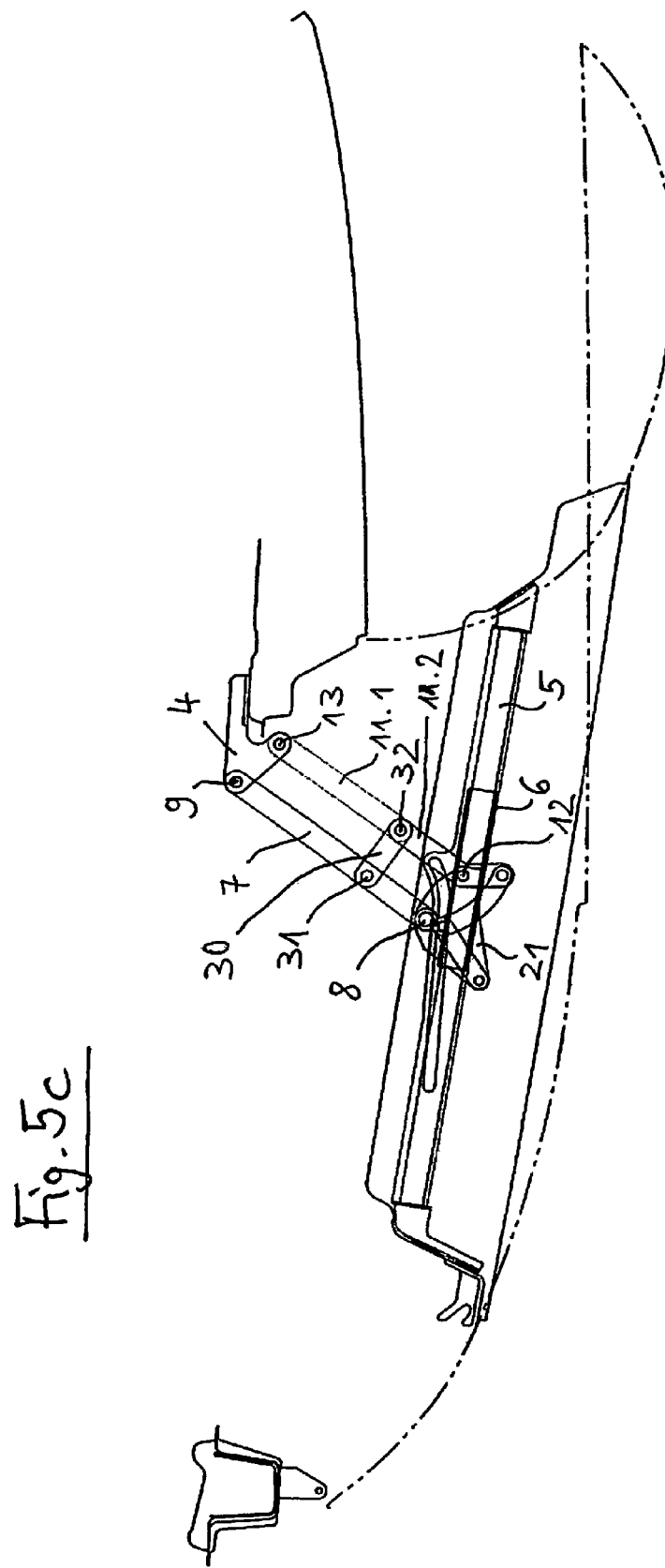

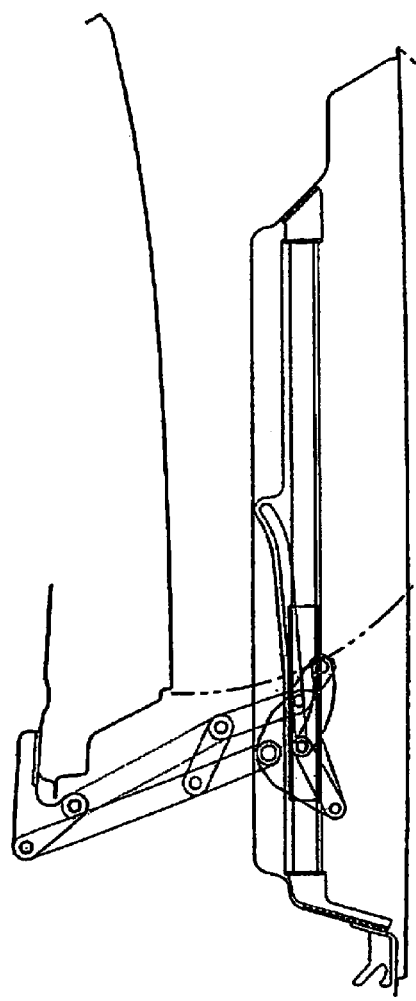

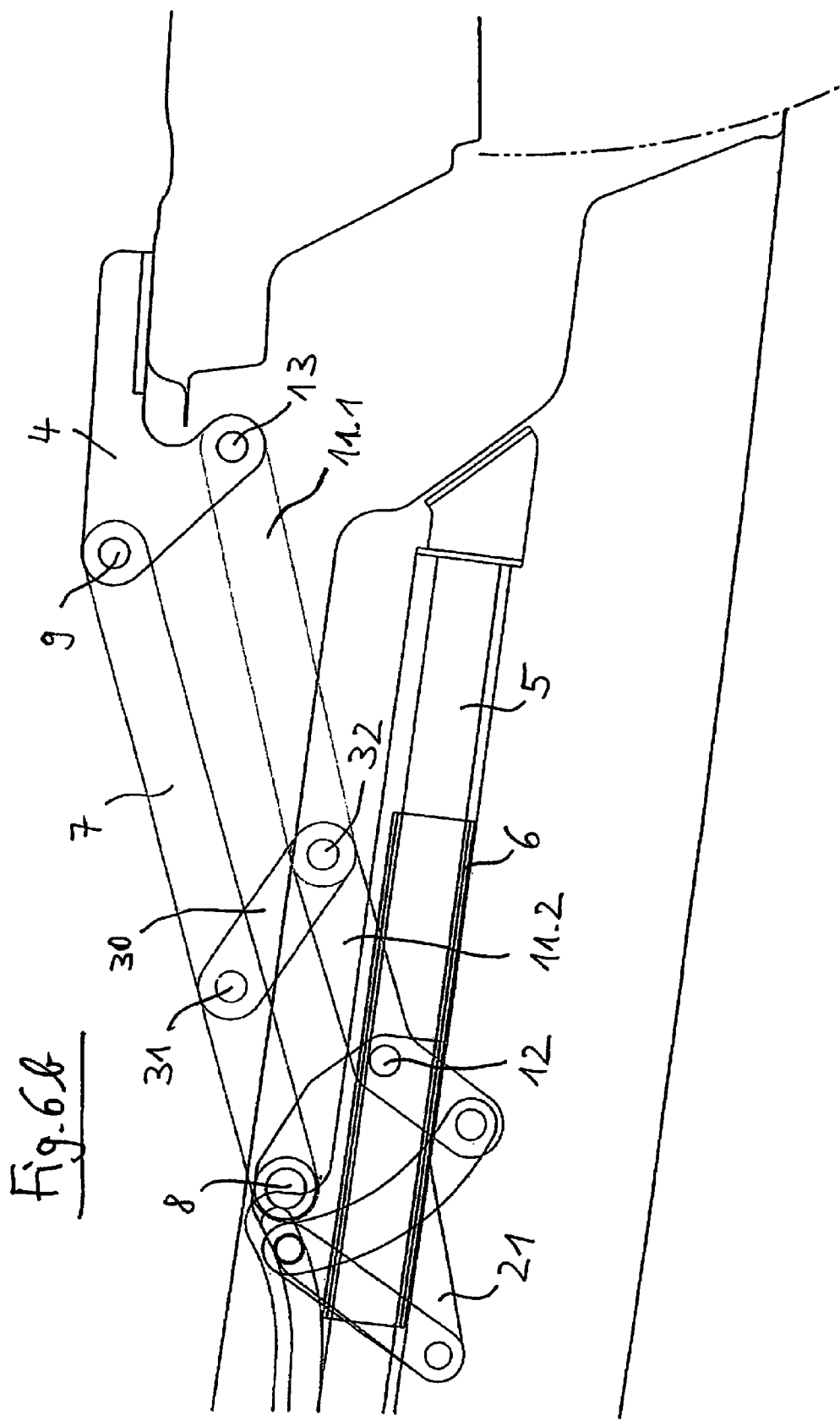

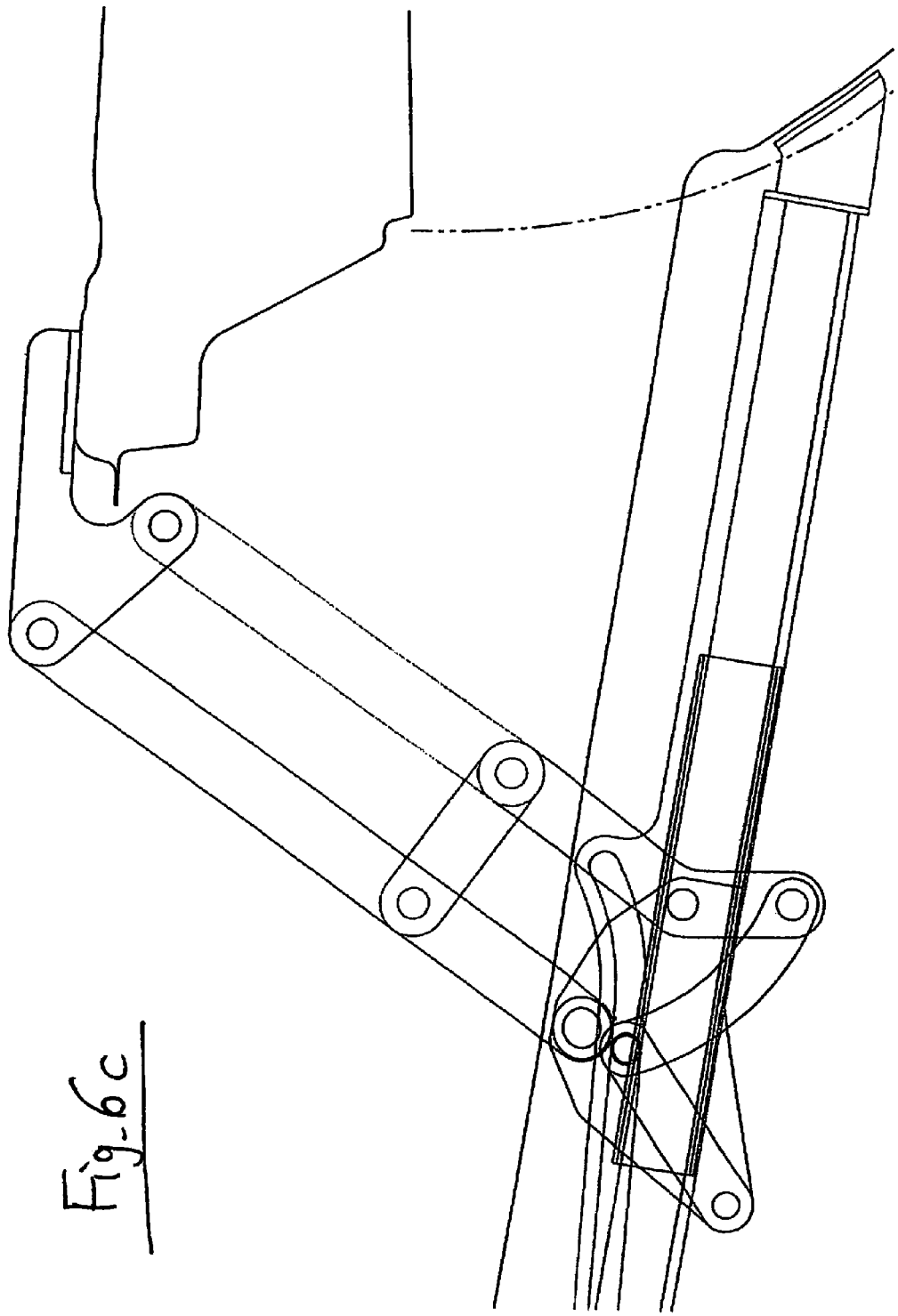

SLIDING DOOR FOR A VEHICLE

BACKGROUND OF THE INVENTION

This invention relates to a sliding door for a vehicle, in particular for a motor vehicle.

From EP 1 721 768 A1 a sliding door for motor vehicles is known, which includes a guide rail on its inside. On the guide rail, a sliding carriage is mounted in a longitudinally movable manner. Furthermore, the sliding door comprises a hinge stirrup which is rotatably mounted on the sliding carriage and on a body flange or some other body part.

The non-prepublished prior German patent applications 10 2007 035 230.3 and 10 2007 035 231.1 likewise disclose sliding doors for motor vehicles.

SUMMARY OF THE INVENTION

It is the object of the invention to propose an improved sliding door for a vehicle, in particular for a motor vehicle.

In accordance with the invention, this object is solved by the features herein. The sliding door comprises a guide rail. On the guide rail, a sliding carriage is mounted in a longitudinally movable manner. The sliding door furthermore comprises a hinge stirrup which is rotatably mounted on the sliding carriage and on a body flange, and a control lever which is rotatably mounted on the sliding carriage and on a or the body flange or some other body part, as well as a first intermediate lever which is rotatably mounted on the control lever, and a second intermediate lever which is rotatably mounted on the first intermediate lever and on the sliding carriage. The first intermediate lever and the second intermediate lever can form a toggle lever. Preferably, the toggle lever points to the inside, based on the vehicle or motor vehicle.

Advantageous developments are described herein.

Preferably, the sliding door can be locked at the end facing away from the hinge stirrup. For this purpose, a hinge bolt for a receptacle at the sliding door can be provided at the vehicle. The hinge bolt preferably is located in the region of the door opening facing away from the hinge stirrup. The receptacle, which preferably is U-shaped, preferably is provided at the end of the sliding door facing away from the hinge stirrup in the closed position of the sliding door. In the closed position of the sliding door, the hinge bolt can be locked in the receptacle. The arrangement can, however, also be made the other way round, i.e. such that the hinge bolt is provided at the sliding door and the receptacle is provided at the vehicle.

Advantageously, the control lever includes a lever arm on which the first intermediate lever is rotatably mounted.

A further advantageous development is characterized in that a guide pin is provided at the connecting joint of the first intermediate lever and the second intermediate lever, which is guided in a guideway provided at the sliding door.

Advantageously, the guideway extends with an inclination relative to the guide rail. In this way, the position of the guide pin and hence of the sliding carriage can be defined relative to the guide rail. The guideway preferably is inclined continuously, i.e. inclined such that an inclination different from zero is present everywhere and that this inclination everywhere points in the same direction. Advantageously, the guideway is inclined outwards in a direction away from the hinge stirrup. The inclination of the guideway can be of equal size along its entire length. It is, however, also possible that the guideway includes portions with a different inclination.

BRIEF DESCRIPTION OF THE DRAWINGS

Embodiments of the invention will be explained in detail below with reference to the attached drawing. In the drawing FIG. 1a shows an embodiment of a sliding door for a motor vehicle with a continuously linear guideway in the closed position in a schematic view from above, FIGS. 1b-d show the opening movement of the sliding door of FIG. 1a from the closed position into the open position, FIG. 1e shows the sliding door of FIGS. 1a-d in the completely open position, FIGS. 2a-e show parts of the representations of FIGS. 1a-e on an enlarged scale, FIGS. 3a-e show the opening movement of a modification of the sliding door of FIGS. 1 and 2 with a guideway, which includes portions with different inclinations, from the closed position into the open position, FIGS. 5a-e show a modification of the sliding door of FIGS. 3 and 4 with a one-part hinge stirrup and a two-part control lever from the closed position into the open position, and FIGS. 6a-e show parts of the representations of FIGS. 5a-e on an enlarged scale.

DESCRIPTION OF THE PREFERRED EMBODIMENTS

Figure 2B:
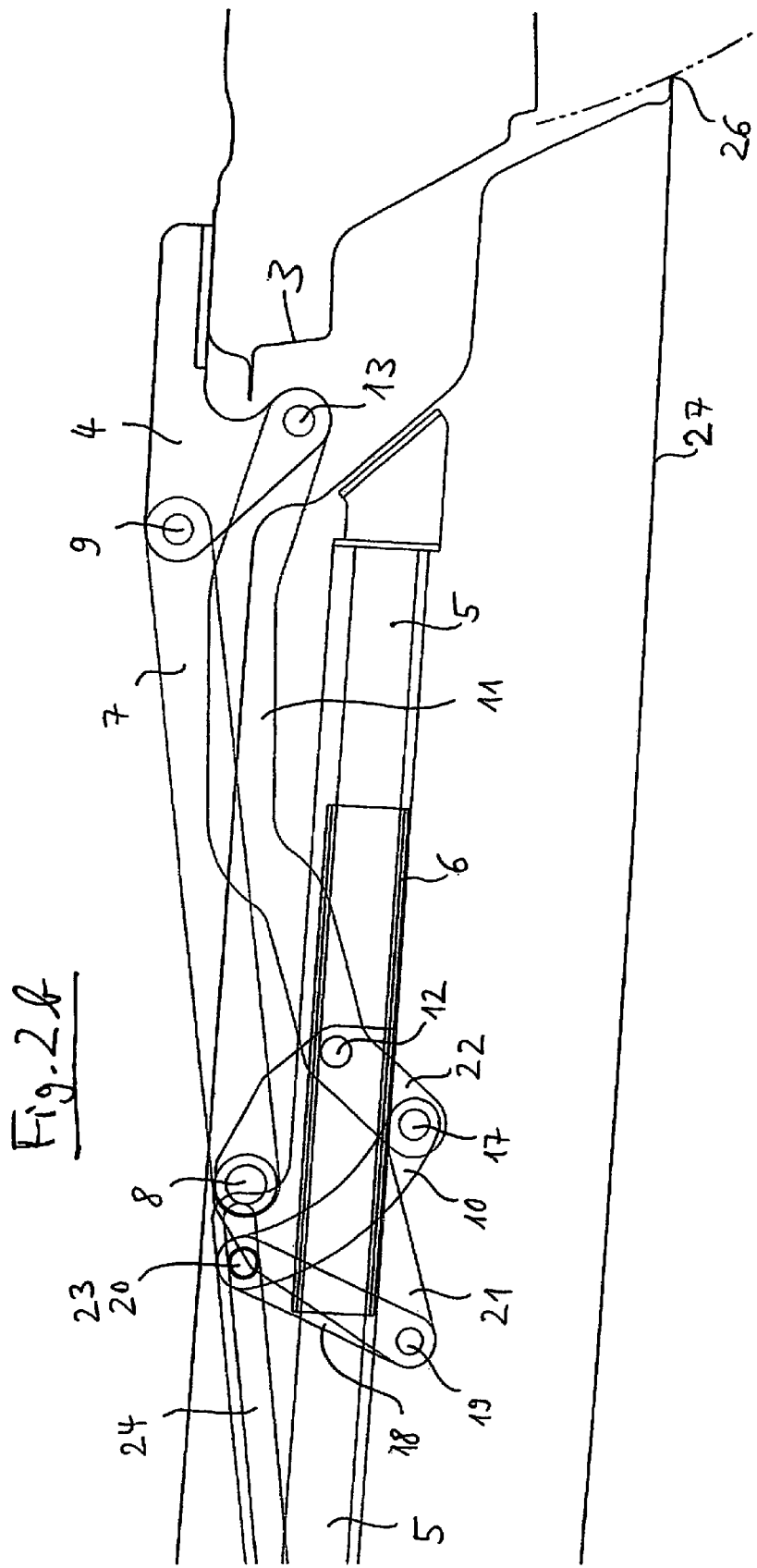

In FIGS. 1a, 2a, 3a, 4a, 5a and 6a the sliding door 1 is in the completely closed position. The sliding door 1 is the left rear door of a motor vehicle. It is disposed in the opening of the body between the B-pillar 2 and a rear body part 3 in whose region a body flange 4 is connected with the body.

On its inside, the sliding door 1 includes a guide rail 5. On the guide rail 5, a sliding carriage 6 is mounted in a longitudinally movable manner.

The sliding door 1 furthermore includes a hinge stirrup 7 and a control lever 11. The hinge stirrup 7 is rotatably mounted on the sliding carriage 6 about a joint 8 and on the body flange 4 about a joint 9. The control lever 11 is rotatably mounted on the sliding carriage 6 about a joint 12 and on the body flange 4 about a joint 13.

On the control lever 11 a first intermediate lever 10 is rotatably mounted, namely about the axis of a joint 17. On the sliding carriage 6 a second intermediate lever 18 is rotatably mounted, namely about the axis of a joint 19. The joint 19 is located in the outer region of the sliding carriage 6. It is located in the region of the front end of the sliding carriage 6. The ends of the intermediate levers 10, 18 facing away from the joints 17, 19 are rotatably connected with each other by a joint 20. The first intermediate lever 10 and the second intermediate lever 18 form a toggle lever. Since the connecting joint 20 of the intermediate levers 10, 18 is located further to the inside than the joints 17, 19 with respect to the motor vehicle, the toggle lever formed by the intermediate levers 10, 18 points to the inside with respect to the motor vehicle.

To the sliding carriage 6 a joint plate 21 is attached, which carries the joints 8, 12 and 19. The hinge stirrup 7, the control lever 11, the sliding carriage 6 as well as the hinge plate 21 and the body flange 4 form a multiple joint with the joints 8, 9, 12 and 13.

At the end of the sliding door 1 opposite the hinge stirrup 7 a U-shaped receptacle 14 is provided at the sliding door 1, which extends inclined with respect to the longitudinal direction of the vehicle, namely in vehicle direction forwards to the inside. It is open at its end facing away from the hinge stirrup 7, i.e. at its front inner end in this embodiment. On a body flange 15, which is attached to the B-pillar 2, a hinge bolt 16 is provided, which engages in the U-shaped receptacle 14. In the completely closed position of the sliding door as shown in FIG. 1a, the hinge bolt 16 is located at the bottom of the U-shaped receptacle 14. It can be locked there (not shown in the drawing).

The control lever 11 includes an extension 22 which extends outwards from the joint 12. The extension 22 extends the control lever 11 along the connecting line from the joint 13 to the joint 12 beyond the joint 12. The extension 22 is slightly bent to the outside and to the rear, respectively, with respect to the connecting line between the joints 13 and 12, i.e. the longitudinal direction of the control lever 11. At the control lever 11, the joint 17 for the first intermediate lever 10 is provided in the region of the outer end of the extension 22.

At the connecting joint 20 of the first intermediate lever 10 and of the second intermediate lever 18, a guide pin 23 is provided, which is guided in a guideway 24. The guideway 24 is provided at the sliding door 1. Correspondingly, the guideway 24 is a guideway firmly mounted in the door. It extends with an inclination relative to the guide rail 5 in a direction away from the hinge stirrup 7 to the outside. The guideway 24 is configured continuously linearly. Its inclination is the same along its entire length.

In the completely closed position of the sliding door 1, which is shown in FIGS. 1a and 2a, the hinge bolt 16 lies in the U-shaped receptacle 14, namely in the region of its end. The guide pin 23 is located in the region of the rear, inner end of the guideway 24. The first intermediate lever 10 points forwards and to the inside from the joint 17. The second intermediate lever 18 points rearwards and to the inside from the joint 19.

In the course of the opening movement, the positions as shown in FIGS. 1b to 1e and the positions as shown in FIGS. 2b to 2e then are taken one after the other. This opening movement can be generated in that the guide rail 5 is moved to the rear relative to the sliding carriage 6. On the sliding carriage 6 a motor, in particular an electric motor, can be provided for driving the guide rail 5 relative to the sliding carriage 6. Instead or in addition a motor, in particular an electric motor, can be provided for driving the hinge stirrup 7 and/or the control lever 11. Advantageously, a motor for driving the hinge stirrup 7 and/or the control lever 11 is provided on the body flange 4 or some other body part.

The opening movement can, however, also be generated by hand instead or in addition. In particular, the guide rail 5 can manually be moved to the rear relative to the sliding carriage 6. For this purpose, a handle or several handles can be provided at the sliding door 1, by means of which the sliding door 1 and with the same the guide rail 5 can be moved relative to the sliding carriage 6. The handle can be provided at the inner front end of the sliding door 1 and/or at the outer front end of the sliding door 1 and/or at the outer rear end of the sliding door 1. The sliding door 1 can be opened and also be closed again by applying force at each of these three points.

Without the guide pin 23, the sliding carriage 6 might freely be shifted on the guide rail 5. The guide pin 23 guided in the guideway 24 prevents this free shiftability and defines the relative position of the sliding carriage 6 with respect to the guide rail 5 and hence with respect to the sliding door 1. This is effected in the portions of the guideway 24 which have an inclination different from zero with respect to the guide rail 5, i.e. do not extend parallel to the guide rail 5. The guideway 24 of the embodiment as shown in FIGS. 1 and 2 has the same inclination different from zero with respect to the guide rail 5 along its entire length.

When the guide rail 5 is moved to the rear relative to the sliding carriage 7 by motor and/or by hand, the guide pin 23 guided in the guideway 24 moves to the outside relative to the guide rail 5 and to the sliding carriage 6, whereby the second intermediate lever 18 is swivelled in clockwise direction about the joint 19. By moving the guide pin 23 relative to the sliding carriage 6 to the rear and to the outside, the joint 17 located at the other end of the first intermediate lever 10 likewise is moved to the rear, whereby the control lever 11 is rotated about the joint 12 in anti-clockwise direction. The control lever 11 thereby is swivelled in anti-clockwise direction about the joint 13 at the body flange 4. By swiveling the control lever 11, the hinge stirrup 7 is also swivelled in anti-clockwise direction about the joint 9. The joint plate 21 of the sliding carriage 6 likewise is forcibly guided by swiveling the hinge stirrup 7 about the joint 9, since it forms a multiple joint with the hinge stirrup 7, the control lever 11 and the body flange 4—as explained above.

The drive movement for opening the sliding door 1 can, however, also be initiated in some other way, in particular by a motorized and/or manual drive of the hinge stirrup 7 and/or the control lever 11 and/or the first intermediate lever 10 and/or the second intermediate lever 18 about one or more of the joints 9, 8, 13, 12, 17, 20, 19.

The completely open position of the sliding door 1 is shown in FIGS. 1e and 2e. The first intermediate lever 10 has been swivelled in clockwise direction about the joint 17 with respect to the extension 22 by about 90°. The guide pin 23 has reached the front, closed end of the guideway 24. The second intermediate lever 18 has been swivelled in clockwise direction about the joint 19 with respect to the sliding carriage 6 or the joint plate 21 by about 45°. The opening angle of the intermediate levers 10, 18 at the joint 20 has been increased from about 30° to about 150°. The control lever 11 and the hinge stirrup 7 have been swivelled by an angle of 120° in anti-clockwise direction about the joints 13 and 9.

When the sliding door 1 is to be closed, the described positions are taken in reverse order, proceeding from the completely open position as shown in FIGS. 1e and 2e. The closing movement of the sliding door 1 can be effected in that the guide rail 5 is moved forwards by motor and/or by hand relative to the sliding carriage 6. The relative movement of the guide rail 5 is transmitted by the guideway 24 to the guide pin 23 and from there introduced into the described multiple joint via the first intermediate lever 10. It is also possible, however, to initiate the closing movement in a way as it has been described for the opening movement.

In FIGS. 1 and 2, the paths of the front end 25 and of the rear end 26 of the outer door panel 27 are illustrated. The front end 25 of the outer door panel 27 initially moves at an angle of about 30° with respect to the longitudinal axis of the vehicle to the rear and to the outside. The angle of inclination of the U-shaped receptacle 14 corresponds to this angle. Subsequently, it describes an arc with a large radius, whose end 28 includes a tangent extending parallel to the longitudinal axis of the vehicle. The rear end 26 of the outer door panel 27 initially moves approximately at right angles away from the body and then describes a narrowing arc up to an end point 29 which substantially has the same distance from the body of the vehicle as the end point 28 of the front end 25.

By means of the invention it becomes possible to open and to close the sliding door by initiating a single movement. In particular, the sliding door can be opened and closed by a movement of the guide rail 5 relative to the sliding carriage 6. It is, however, also possible to generate and initiate the opening movement and the closing movement of the sliding door in some other way, as described above. Furthermore, a sliding door can be realized by the invention, whose movable parts require only very little space in a direction transverse to the longitudinal axis of the vehicle. The maximum width of these movable parts is determined by the distance between the location of the joint 20 in FIG. 1a and the location of the joint 17 in FIG. 1c.

Figure 4L:
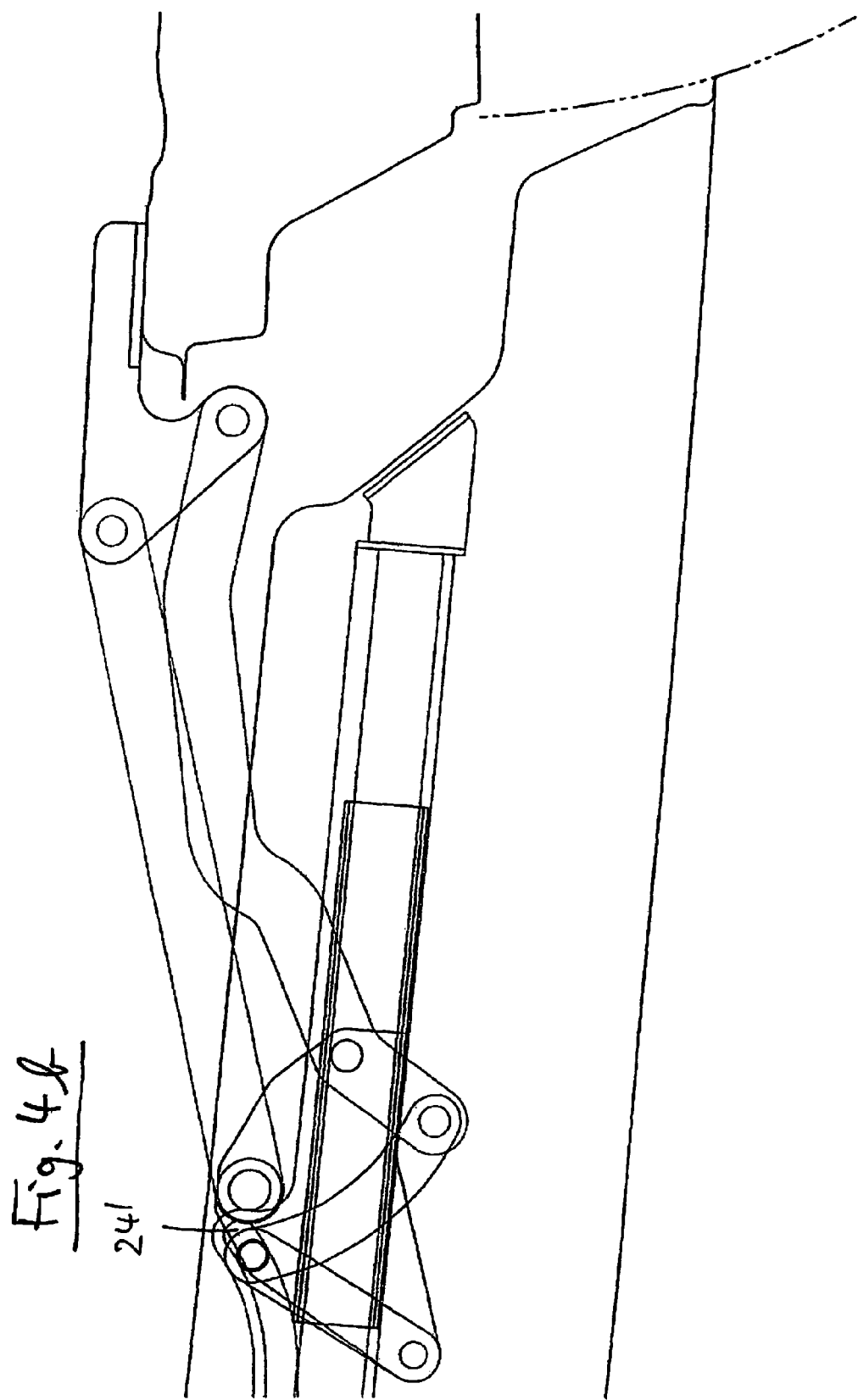
FIGS. 4a-e show parts of the representations of FIGS. 3a-e on an enlarged scale.
Figure 4E:
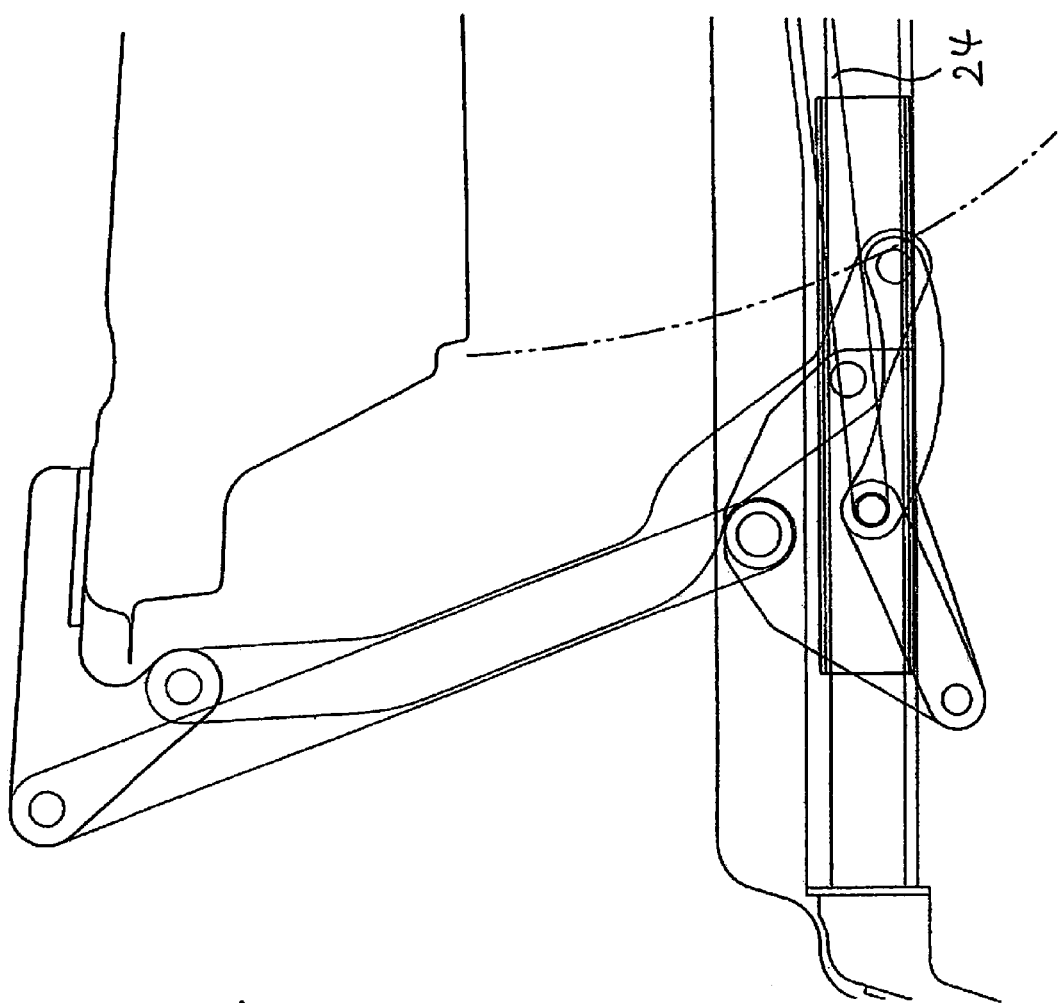

FIGS. 3 and 4 show an embodiment in which the guideway 24 has a curved portion 24' at its rear inner end, whose inclination with respect to the guide rail 5 is greater than the linear region. As a result, the opening movement of the rear end 26 of the outer door panel 27 from the closed position as shown in FIG. 3a extends at a right angle, i.e. even steeper than in FIG. 1a.

Figure 5A:
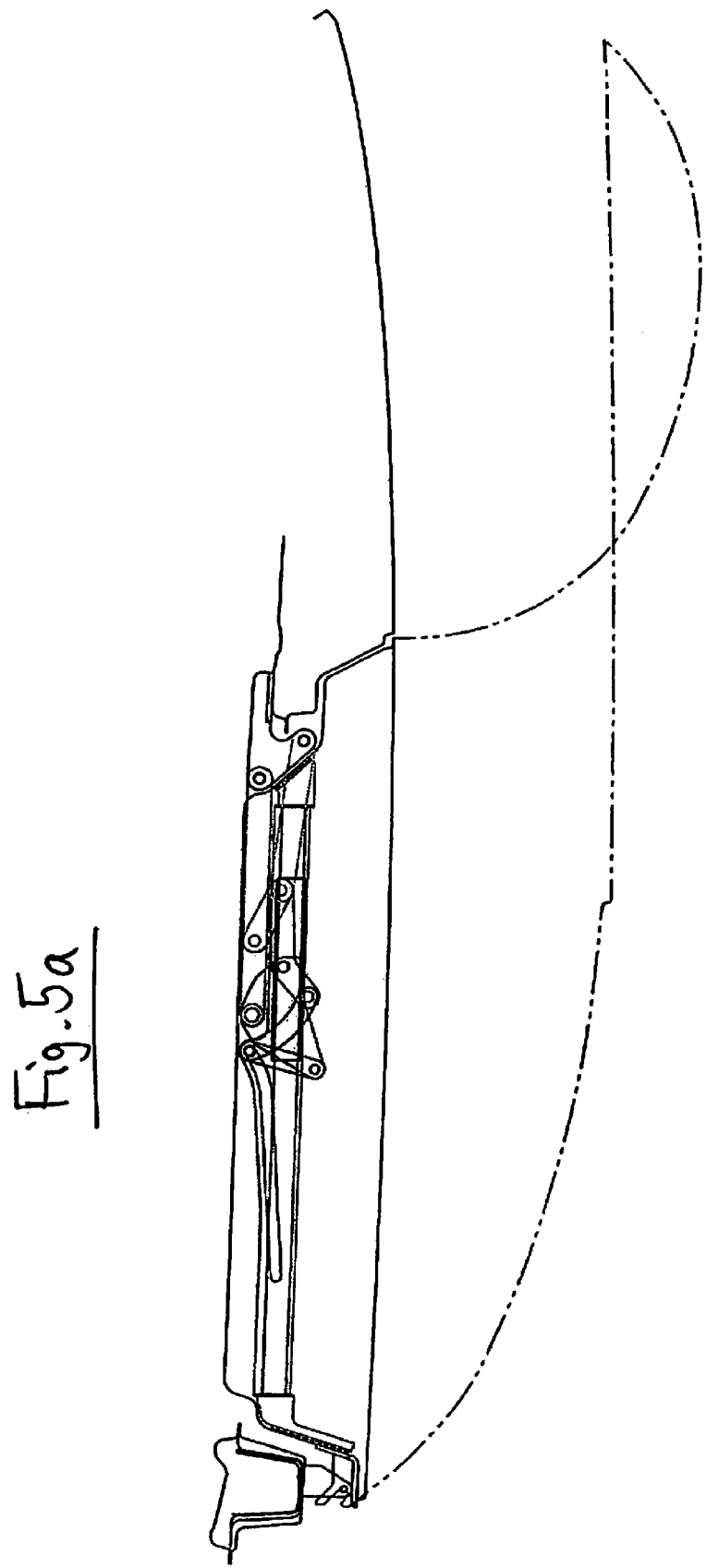
Figure 5B:
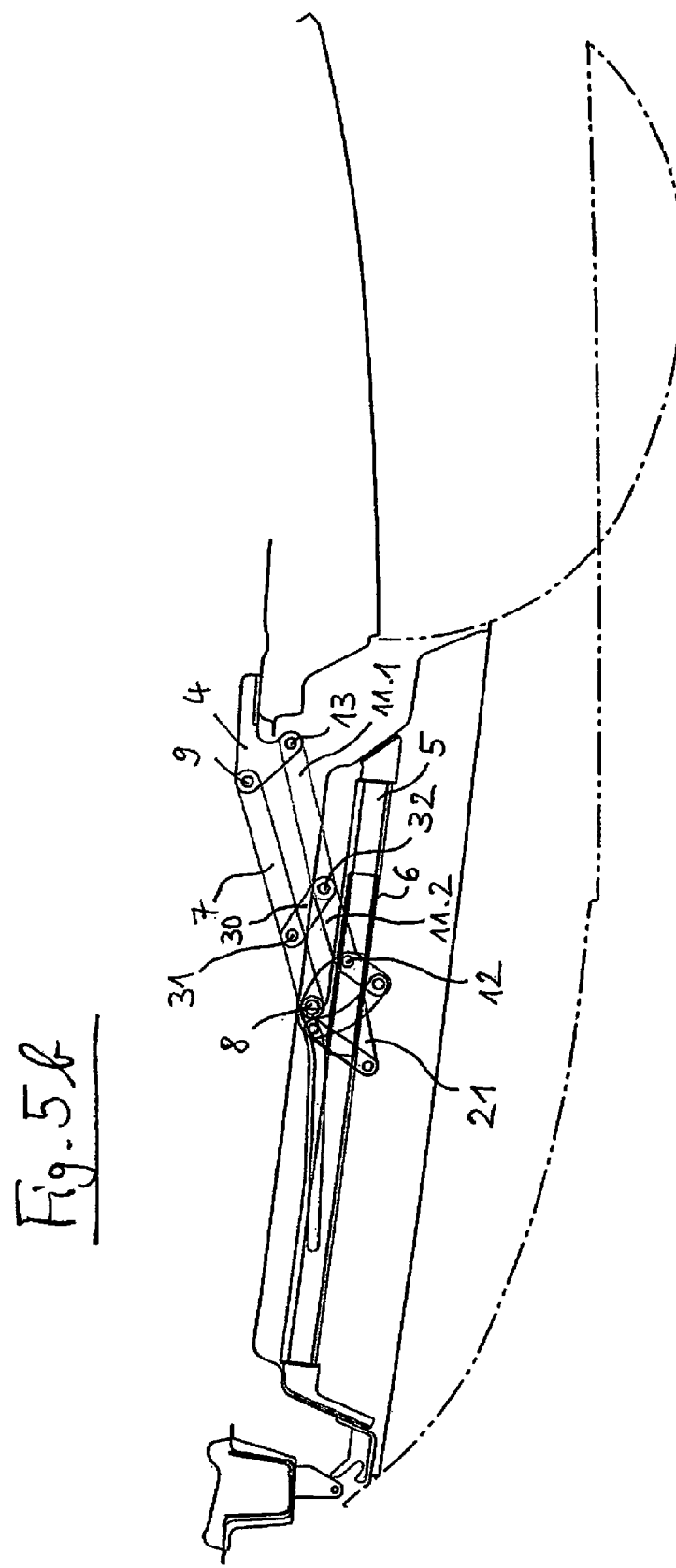
Figure 5D:
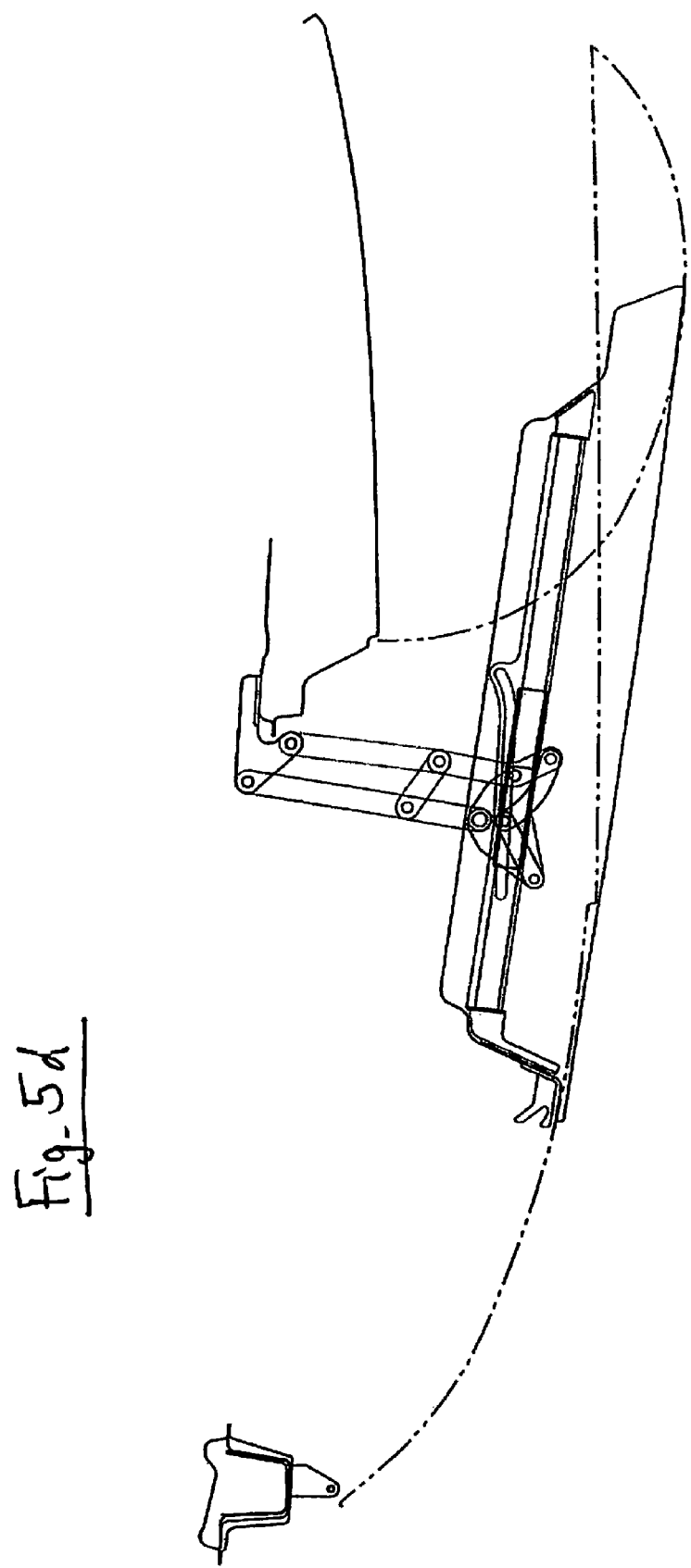
Figure 6A:
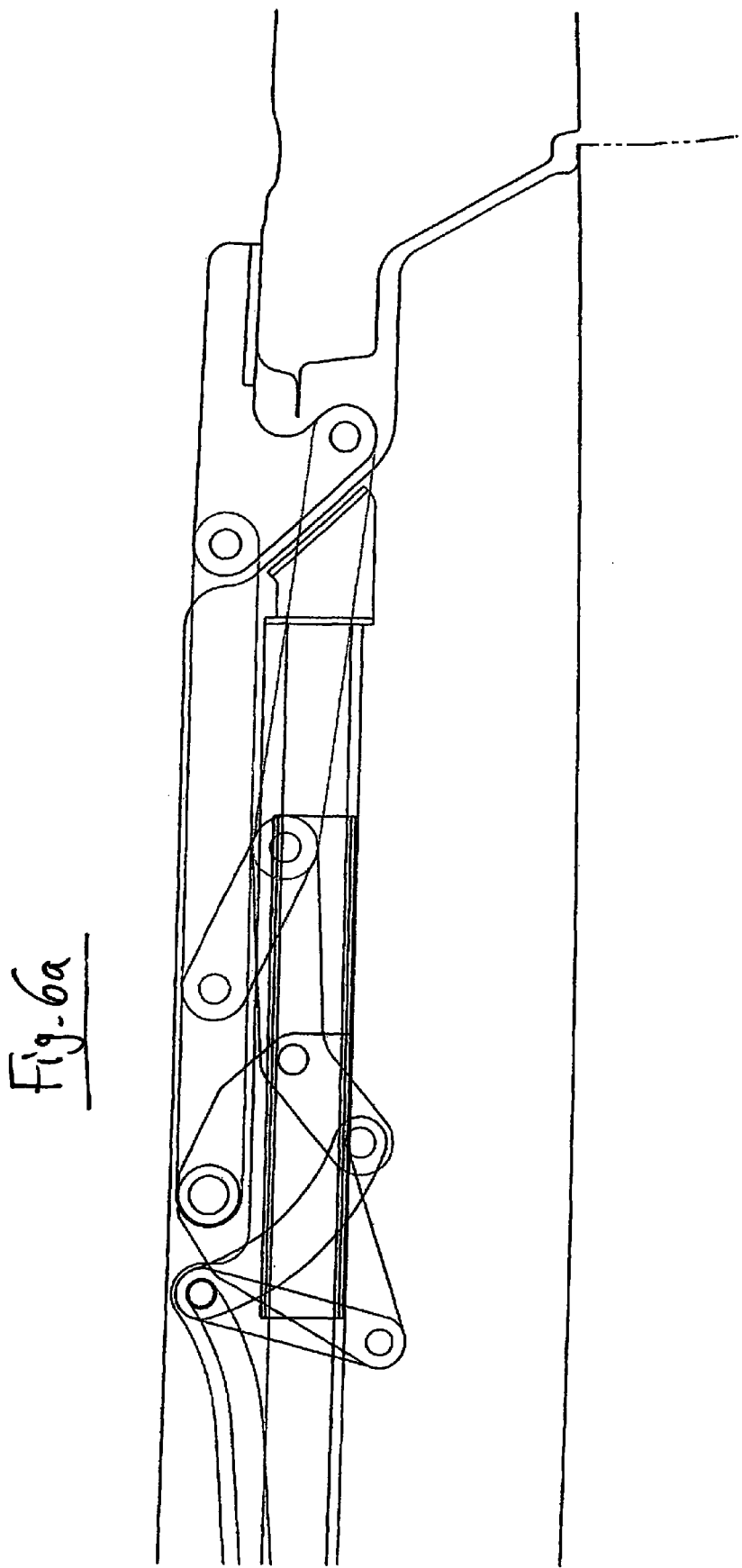
Figure 6D:
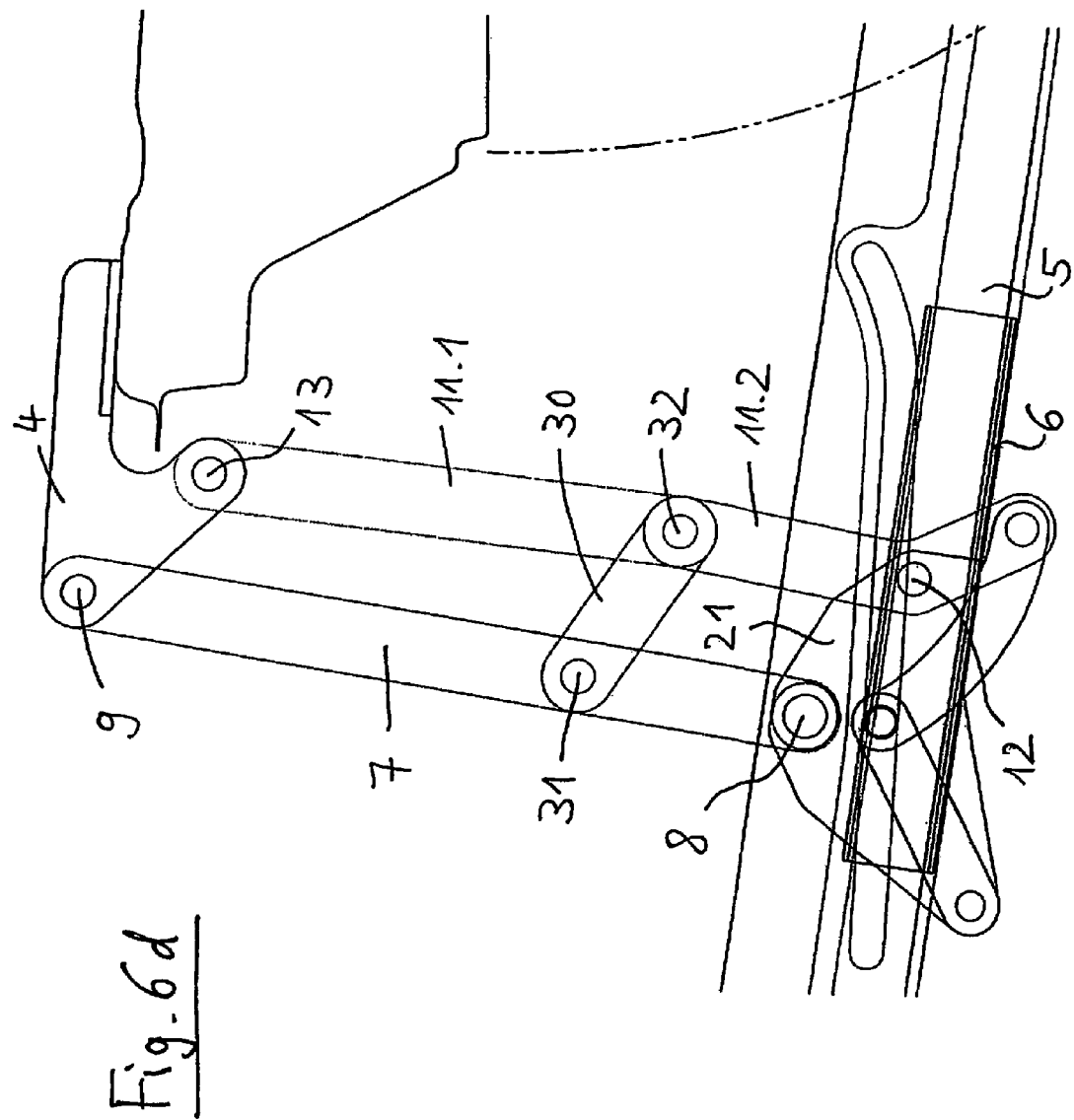
Figure 6E:
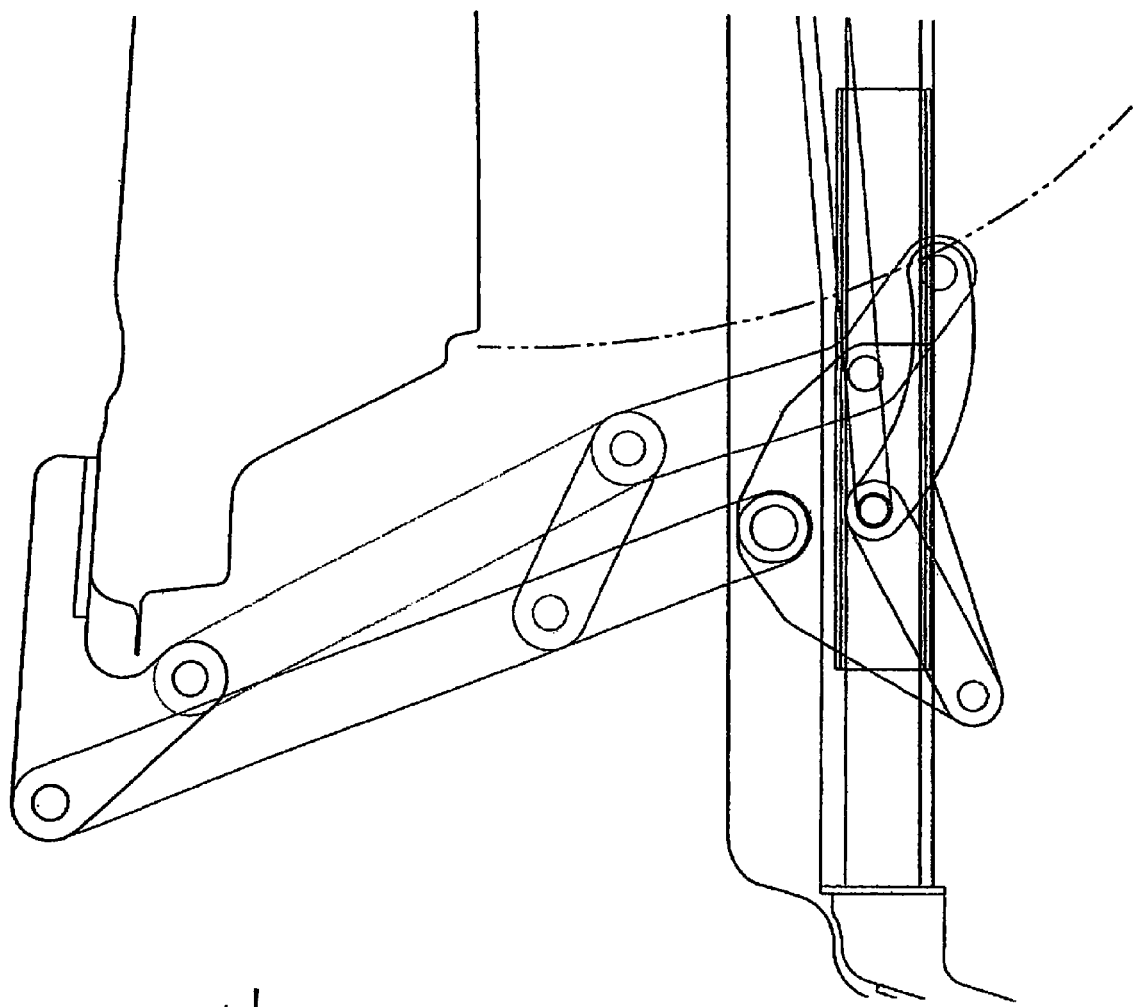

In the embodiment of FIGS. 5 and 6, the course of the guideway 24 corresponds with that of FIGS. 3 and 4. In contrast to the embodiment of FIGS. 3 and 4, however, the control lever 11 is formed in two parts in the embodiment of FIGS. 5 and 6. The hinge stirrup 7 is rotatably mounted on the body flange 4 about the joint 13 and is rotatably mounted on the joint plate 21 of the sliding carriage 6 about the joint 8. The first control lever 11.1 is rotatably mounted on the body flange 4 about the joint 13. The second control lever 11.2 is rotatably mounted on the joint plate 21 of the sliding carriage 6 about the joint 12. Furthermore, a connecting lever 30 is provided. One end of the connecting lever 30 is rotatably connected with the hinge stirrup 7 by a joint 31. The other end of the connecting lever 30 is rotatably connected with the respective other ends of the control levers 11.1, 11.2 by a joint 32. The hinge stirrup 7, the control levers 11.1, 11.2, the body flange 4, the joint plate 21 and the connecting lever 30 form a multiple joint, by which the joint plate 21 and with the same the sliding carriage 6 is forcibly guided.

The invention claimed is:

1. A sliding door for a vehicle, comprising
   a guide rail (5),
   a sliding carriage (6) which is mounted on the guide rail (5) in a longitudinally movable manner,
   a hinge stirrup (7) which is rotatably (8, 9) mounted on the sliding carriage (6) and on a body flange (4),
   a control lever (11) which is rotatably (12, 13) mounted on the sliding carriage (6) and on a body flange (4),
   a first intermediate lever (10) which is rotatably (17) mounted on the control lever (11), and
   a second intermediate lever (18) which is rotatably (20, 19) mounted on the first intermediate lever (10) and on the sliding carriage (6),
   wherein the control lever (11) includes an extension (22) on which the first intermediate lever (10) is rotatably (17) mounted
   wherein a guide pin (23) is provided at a connecting joint (20) of the first intermediate lever (10) and of the second intermediate lever (18), which is guided in a guideway (24) provided at the sliding door.

2. The sliding door according to claim 1, wherein the sliding door (1) can be locked (14, 16) at an end facing away from the hinge stirrup (7).

3. The sliding door according to claim 1, wherein the guideway (24) extends with an inclination relative to the guide rail (5).

4. The sliding door according to claim 1, wherein the guideway (24) extends with an inclination in a direction away from the hinge stirrup (7) toward an outside of the sliding door.

5. The sliding door according to claim 2, wherein the guideway (24) extends with an inclination relative to the guide rail (5).

6. The sliding door according to claim 5, wherein the guideway (24) extends with an inclination in a direction away from the hinge stirrup (7) toward an outside of the sliding door.

7. The sliding door according to claim 2, wherein the guideway (24) extends with an inclination in a direction away from the hinge stirrup (7) toward an outside of the sliding door.

8. The sliding door according to claim 3, wherein the guideway (24) extends with an inclination in a direction away from the hinge stirrup (7) toward an outside of the sliding door.

* * * * *